(12) United States Patent
Li et al.

(10) Patent No.: US 11,623,202 B2
(45) Date of Patent: Apr. 11, 2023

(54) COMPOSITE STRUCTURE AND METHOD OF FORMING THE SAME

(71) Applicant: Agency for Science, Technology and Research, Singapore (SG)

(72) Inventors: Xu Li, Singapore (SG); Chin Chong Ray Yap, Singapore (SG); Jiating He, Singapore (SG); Siew Yee Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 320 days.

(21) Appl. No.: 16/614,191

(22) PCT Filed: May 15, 2018

(86) PCT No.: PCT/SG2018/050235
§ 371 (c)(1),
(2) Date: Nov. 15, 2019

(87) PCT Pub. No.: WO2018/212712
PCT Pub. Date: Nov. 22, 2018

(65) Prior Publication Data
US 2020/0171457 A1 Jun. 4, 2020

(30) Foreign Application Priority Data
May 18, 2017 (SG) .......................... 10201704083X

(51) Int. Cl.
| | | |
|---|---|---|
| *B01J 20/20* | (2006.01) | |
| *B01J 20/02* | (2006.01) | |
| *B01J 20/22* | (2006.01) | |
| *B01J 20/28* | (2006.01) | |
| *B01J 20/30* | (2006.01) | |

(52) U.S. Cl.
CPC ........... *B01J 20/0229* (2013.01); *B01J 20/20* (2013.01); *B01J 20/22* (2013.01); *B01J 20/28016* (2013.01); *B01J 20/3078* (2013.01)

(58) Field of Classification Search
CPC ..................................................... B01J 20/20
See application file for complete search history.

(56) References Cited

U.S. PATENT DOCUMENTS

| | | | | |
|---|---|---|---|---|
| 3,803,033 | A * | 4/1974 | Sutherland | B01D 21/0012 210/673 |
| 7,722,843 | B1 * | 5/2010 | Srinivasachar | B01J 20/02 95/137 |
| 8,313,723 | B2 * | 11/2012 | Istvan | D01F 11/12 502/418 |
| 8,343,626 | B2 | 1/2013 | Solovyov | |
| 8,535,422 | B2 * | 9/2013 | Via | B01J 20/0266 95/134 |
| 8,664,153 | B1 * | 3/2014 | Ahumada | B01J 20/0222 502/417 |
| 8,709,972 | B2 * | 4/2014 | Istvan | H01M 4/96 502/425 |
| 2003/0087095 | A1 | 5/2003 | Lewis et al. | |
| 2010/0291167 | A1 | 11/2010 | Iida et al. | |
| 2011/0017611 | A1 | 1/2011 | Menozzi et al. | |
| 2011/0112246 | A1 | 5/2011 | Antonietti et al. | |
| 2011/0278499 | A1 | 11/2011 | McKedy et al. | |
| 2013/0058724 | A1 | 3/2013 | John et al. | |
| 2014/0004232 | A1 | 1/2014 | Foltynowicz et al. | |
| 2014/0027677 | A1 | 1/2014 | Lipka et al. | |

FOREIGN PATENT DOCUMENTS

| | | |
|---|---|---|
| CN | 1508192 A | 6/2004 |
| CN | 103157438 A | 6/2013 |
| CN | 105680081 A | 6/2016 |
| EP | 1974808 A1 | 10/2008 |
| JP | 2013508130 A | 3/2013 |
| WO | 2016190815 A1 | 12/2016 |

OTHER PUBLICATIONS

Extended European Search Report for European Patent Application No. 18802699.1 dated Jan. 13, 2021, pp. 1-9.
Office Action for Japanese Patent Application No. 2019-563734 dated Dec. 7, 2021, pp. 1-3.
International Search Report for International Application No. PCT/SG2018/050235 dated Jul. 30, 2018, pp. 1-4.
Written Opinion of the International Searching Authority for International Application No. PCT/SG2018/050235 dated Jul. 30, 2018, pp. 1-4.
Chen et al., "A Two-Step Hydrothermal Synthesis Approach to Monodispersed Colloidal Carbon Spheres," Nanoscale Res Lett, vol. 4, 2009, pp. 971-976.
Hoekstra et al., "Carbon-Supported Base Metal Nanoparticles: Cellulose at Work," ChemSusChem, vol. 8, 2015, pp. 985-989.
Office Action for Chinese Patent Application No. 2018800459447 dated Dec. 31, 2021, pp. 1-5.

* cited by examiner

*Primary Examiner* — Stuart L Hendrickson
(74) *Attorney, Agent, or Firm* — Shackelford, Bowen, McKinley & Norton, LLP

(57) ABSTRACT

A method of forming one or more composite structures is provided wherein one or more carbon structures is formed from a carbon source via a hydrothermal process. Said carbon source is a biomass material including glucose and glucosamine hydrochloride. In particular, the method further comprises introducing a seeding additive of potassium or phosphate salt, preferably monopotassium phosphate to the carbon source. The method includes introducing iron onto the carbon structures to form the one or more composite structures including carbon and iron.

15 Claims, 30 Drawing Sheets

FIG. 3

> 1. Large-scale synthesis of carbon nanoparticles through hydrothermal reaction (short time, high yield, etc.) — 302

⇩

> 2. Spray dry process (high Fe% loading, high uniformity, short time, continuous process, etc.) — 304

⇩

> 3. Carbonization step (improved Fe/C oxygen scavenger structure) — 306

Glucose In high pressure reactor

Formation of C particles

FIG. 5

| Hydrothermal Conditions | | 0 wt% Solution A (180g Glucose in 1.5 L) | 0.05 wt% Solution A + 0.09g $KH_2PO_4$ | 0.1 wt% Solution A + 0.18g $KH_2PO_4$ | 0.3 wt% Solution A + 0.54g $KH_2PO_4$ | 0.9 wt% Solution A + 0.9g $KH_2PO_4$ |
|---|---|---|---|---|---|---|
| 200 °C for 20 min | Mean size (nm) | 371 | 261 | 253 | 224 | 333 |
|  | C Yield | 20.83% | 26.83% | 26.96% | 25.78% | 24.73% |
| 200 °C for 30 min | Mean size (nm) | 331 | 328 | 315 | 321 | 338 |
|  | C Yield | 25.78% | 27.08% | 25.78% | 29.4% | 32.8% |
| 210 °C for 0 min | Mean size (nm) | 373 | 309 | 280 | 364 | 347 |
|  | C Yield | 43.2% | 26.04% | 32.29% | 33.85% | 39.06% |
| 210 °C for 10 min | Mean size (nm) | 412 | 401 | 370 | 372 | 406 |
|  | C Yield | 44.27% | 41.15% | 38.54% | 36.72% | 46.35% |

FIG. 7

| Without KH$_2$PO$_4$ | | | With KH$_2$PO$_4$ | | | |
|---|---|---|---|---|---|---|
| Hydrothermal condition | Mean size | Yield | Hydrothermal condition | Mean size | Yield | Yield |
| 180 °C for 180 min | 250 nm | 14.60% | 200 °C for 20 min | 253 | 23.96% | +64.11% |
| 190 °C for 90 min | 310 nm | 15.50% | 210 °C for 0 min | 309 | 26.04% | +68.0% |
| 200 °C for 30 min | 335 nm | 25.78% | 200 °C for 30 min | 338 | 32.8% | +27.23% |

FIG. 9

| Time (Hrs) | 0% | 0.05% | 0.1% | 0.3% | 0.5% |
|---|---|---|---|---|---|
| 0 | 0 | 0 | 0 | 0 | 0 |
| 1 | 0 | 0 | 0 | 0 | 0 |
| 2 | 18.18 | 5.71 | 10 | 16.00 | 17.89 |
| 3 | 37.27 | 18.57 | 22.14 | 34.00 | 35.79 |
| 4 | 44.55 | 22.86 | 27.86 | 43.00 | 44.21 |
| 5 | 60.00 | 31.42 | 37.14 | 59.00 | 57.89 |
| 6 | 73.64 | 40.71 | 47.14 | 75.00 | 73.68 |
| 7 | 80 | 43.57 | 47.86 | 79.00 | 81.05 |
| 8 | 88.18 | 49.29 | 53.57 | 86.00 | 87.37 |
| 24 | 140.27 | 117.86 | 130.79 | 161.40 | 147.16 |
| 48 | 129.55 | 132.43 | 144.28 | 166.10 | 137.16 |
| 72 | 120.36 | 139.86 | 146.78 | 160.80 | 127.89 |
| 96 | 112.36 | 142.34 | 147.04 | 155.00 | 118.95 |
| Max scavenging capacity per g/Fe | 140.27 | 142.34 | 147.04 | 166.10 | 147.16 |

FIG. 10

| Time (Hrs) | 40% | 50% | 60% | 70% | 80% | 90% |
|---|---|---|---|---|---|---|
| 0 | 20.9 | 20.9 | 20.9 | 20.9 | 20.9 | 20.9 |
| 2 | 19.5 | 20.4 | 20.2 | 19.2 | 19.9 | 19.9 |
| 6 | 16.6 | 19.2 | 16.2 | 17.1 | 17.3 | 17.3 |
| 8 | 14 | 17.9 | 12.8 | 14.3 | 14.4 | 14.4 |
| 24 | 2.31 | 9.03 | 2.23 | 2.38 | 2.41 | 2.41 |
| 48 | 2.74 | 1.85 | 2.79 | 2.67 | 2.84 | 2.84 |
| 72 | 2.97 | 2.06 | 3.04 | 2.92 | 3.12 | 3.1 |
| Max scavenging capacity per g/Fe | 238.38 | 190.5 | 155.58 | 132.29 | 115.56 | 102.72 |

FIG. 13

| Time (Hrs) | 500 °C (3 hrs) | 500 °C (12 hrs) | 600 °C (3 hrs) | 700 °C (3 hrs) | 800 °C (3 hrs) | 900 °C (3 hrs) |
|---|---|---|---|---|---|---|
| 0 | 20.9 | 20.9 | 20.9 | 20.9 | 20.9 | 20.9 |
| 1 | 20.9 | 20.9 | 20.9 | 20.9 | 20.9 | 20.9 |
| 2 | 20.9 | 20.9 | 20.9 | 20.5 | 18.8 | 19.4 |
| 3 | 20.9 | 18.9 | 19.2 | 18.2 | 17.2 | 17.3 |
| 4 | 20.9 | 18.2 | 18.3 | 17 | 16.3 | 15.5 |
| 5 | 20.9 | 17.2 | 17.4 | 16 | 15.9 | 14 |
| 6 | 20.9 | 15.9 | 16.7 | 15.6 | 14.9 | 13.3 |
| 7 | 20.9 | 15.6 | 15.8 | 14.4 | 14.4 | 11.6 |
| 8 | 20.9 | 15 | 15.1 | 13.3 | 13.6 | 10.4 |
| 24 | 20.9 | 10.6 | 9.51 | 8.48 | 8.1 | 7 |
| 48 | 20.9 | 10.6 | 8.85 | 7.33 | 7.1 | 5.15 |
| 72 | 20.9 | 10.8 | 8.89 | 7.53 | 7.1 | 3.54 |
| 96 | 20.9 | 11.3 | 9.45 | 8.06 | 7.1 | 2.73 |
| Max scavenging capacity per g/Fe | 0 | 93.64 | 120.00 | 135.7 | 138 | 165.18 |

FIG. 15

| Time (Hrs) | 500 °C (3 hrs) | 800 °C (3 hrs) |
|---|---|---|
| 0 | 20.9 | 20.9 |
| 2 | 18.6 | 19.6 |
| 6 | 15.1 | 15.4 |
| 8 | 14.2 | 10.9 |
| 24 | 14 | 2.33 |
| 48 | 14.8 | 3.72 |
| 72 | 14.7 | 3.9 |
| Max scavenging capacity per g/Fe | 69 | 185.7 |

FIG. 17

| Humidity | 23% | 43% | 63% | 75% | 100% |
|---|---|---|---|---|---|
| Max scavenging capacity per g/Fe | 0 | 60 | 59 | 118.5 | 138 |

FIG. 19B

| Sample | O$_2$ Adsorption Capacity (cc/g Fe) |
|---|---|
| 40% Fe | 84.09 |
| 40% Fe with 5 wt% Glucosamine | 195.88 |
| 40% Fe with 20 wt% Glucosamine | 238.38 |
| 40% Fe with 50 wt% Glucosamine | 0 |

COMPOSITE STRUCTURE AND METHOD OF FORMING THE SAME

CROSS-REFERENCE TO RELATED APPLICATION

This application claims the benefit of priority of Singapore application No. 10201704083X filed on May 18, 2017, the contents of it being hereby incorporated by reference in its entirety for all purposes.

TECHNICAL FIELD

Various aspects of this disclosure may relate to a method of forming a composite structure. Various aspects of this disclosure may relate to a composite structure.

BACKGROUND

Oxygen ($O_2$) is one of the main factors resulting in the spoilage of food. The presence of oxygen results in the deterioration of quality, change in color, loss of nutrients, and growth of microorganisms.

As such, industries make use of different technologies such as vacuum packaging and modified atmosphere packaging (MAP) to limit the $O_2$ concentration in the packaging. These technologies require costly investments, and may yet be unable to completely remove the $O_2$ in the packed food. The packages usually have residual concentrations of around 0.5% to 3%, and are unable to completely prevent the $O_2$ from external environment from penetrating into the package over time. Oxygen scavengers are required for reducing and maintaining a low level of $O_2$ concentration in the packaging.

The majority of the oxygen scavengers are based on iron powder, ascorbic acid, and unsaturated hydrocarbon scavengers. Other types of oxygen scavengers include cerium oxide particles, enzymes etc. Amongst these oxygen scavengers, iron-based oxygen scavengers are the most well-known and readily available products in the market, due to their high scavenging efficiency and low cost. Organic and unsaturated hydrocarbon scavengers are relatively unstable and may give out odor as by-product after the oxidation process.

SUMMARY

Various embodiments may provide a method of forming one or more composite structures. The method may include forming one or more carbon structures from a carbon source via a hydrothermal process. The method may also include introducing iron onto the carbon structures to form the one or more composite structures including carbon and iron.

Various embodiments may provide a composite structure formed by any method described herein.

BRIEF DESCRIPTION OF THE DRAWINGS

The invention will be better understood with reference to the detailed description when considered in conjunction with the non-limiting examples and the accompanying drawings, in which:

FIG. 3 shows a schematic illustrating a method of forming one or more composite structures according to various embodiments.

FIG. 5 is a table showing the size and carbon (C) yield of the carbon particles at 200° C. and 210° C., for dwell times from 0 minute to 30 minutes according to various embodiments.

FIG. 7 is a table showing the yield of carbon particles under different hydrothermal conditions and with or without addition of monopotassium phosphate ($KH_2PO_4$) according to various embodiments.

FIG. 9 shows a table listing the scavenging capacities (in per gram (g) of iron (Fe)) of the composite particles according to various embodiments.

FIG. 10 is a table showing the oxygen concentration (in percent or %) of composite particles with different iron content with time (in hours or Hrs) according to various embodiments.

FIG. 13 is a table showing the oxygen concentration (in percent or %) of composite particles prepared by annealing in various different temperatures and durations with time (in hours or Hrs) according to various embodiments.

FIG. 15 is a table showing the oxygen concentration (in percent or %) of composite particles annealed in forming gas at 500° C. and at 800° C. with time (in hours or Hrs) according to various embodiments.

FIG. 17 is a table showing the maximum scavenging capacity per gram (g) of iron (Fe) of composite particles at different humidity according to various embodiments.

FIG. 19B is a table showing the oxygen ($O_2$) adsorption capacity (in cubic centimeters per gram of iron or cc/g Fe) of composite particles according to various embodiments.

DETAILED DESCRIPTION

Figure 1:
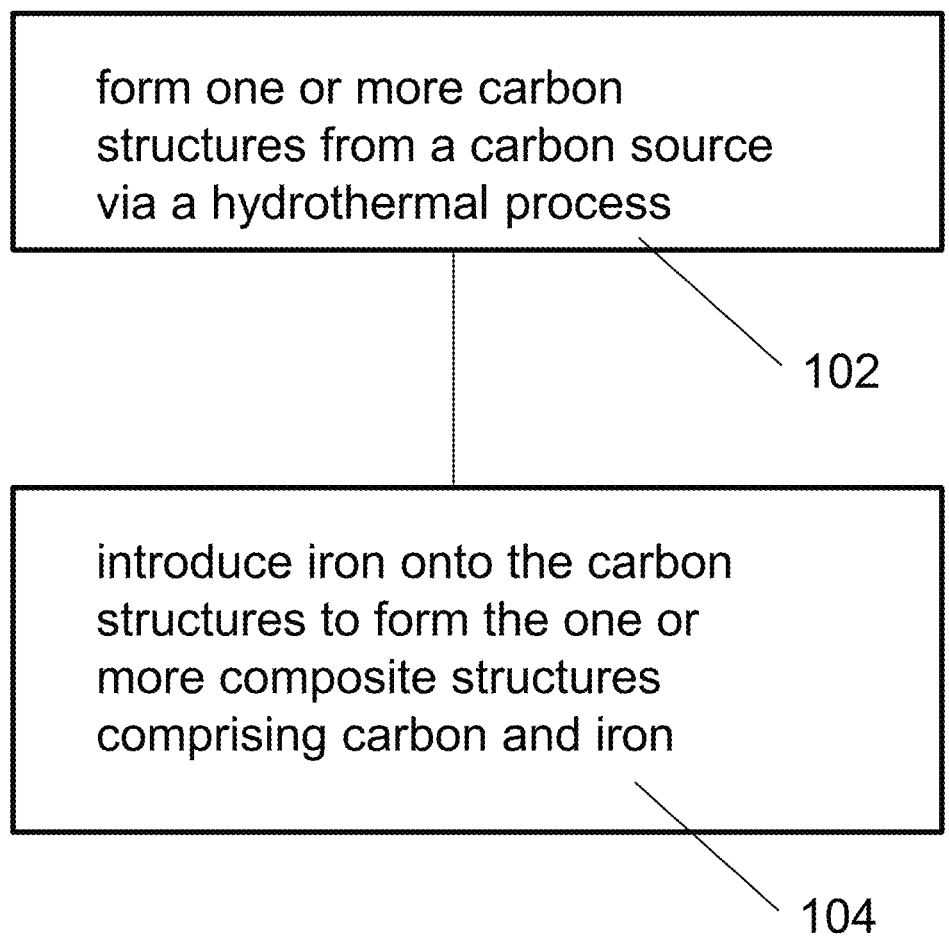
FIG. 1 shows a schematic illustrating a method of forming one or more composite structures according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or composite structures are analogously valid for the other methods or composite structures. Similarly, embodiments described in the context of a method are analogously valid for a composite structure, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The composite structure as described herein may be operable in various orientations, and thus it should be understood that the terms "top", "topmost", "bottom", "bottommost" etc., when used in the following description are used for convenience and to aid understanding of relative positions or directions, and not intended to limit the orientation of the composite structure.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Active packaging may refer to packaging systems that have desirable functions other than an inert barrier to the external environment, thereby improving the quality, shelf-life and safety of the packaged food.

Oxygen scavengers may account for 57% of the plastic packaging market, as oxygen is one of the main factors for food spoilage. The demand on oxygen absorbers may be spurn by rising demand for packaged perishable food. Iron powder scavengers are widely accepted and widely commercially available as an oxygen scavenger. Iron powder scavengers have high oxygen scavenging capacity, are non-toxic, low cost, and have no odor as by-products unlike organic scavengers. However, iron powder scavengers have large (in millimeter scale) sizes, have relatively low scavenging efficiency, and are limited to sachet packaging.

The efficiency of iron-based oxygen scavengers may be dependent on the absorption capacity ($cm^3$ of $O_2$ absorbed/gram of iron) and absorption rate. It is postulated that a good dispersion (homogeneity) of iron particles on a carrier or support without agglomeration will enhance its absorption capacity. In addition, nanosizes of stable iron particles and high surface areas of support are important factors to produce an oxygen scavenger with superior absorption capacity performance.

The inventors have previously come up with a method for preparing carbon particles derived from biomass materials and using it as a support, a protector and a reducing agent for nanostructured zero-valent iron particles. The iron particles were uniformly grown on the surfaces of carbon support with good homogeneity and high stability under ambient conditions. The developed iron/carbon nanostructures show promising oxygen scavenging property for packaging applications. The iron/carbon nanostructures were prepared in a small scale. Scaling up the manufacturing process of these Fe/C hybrid nanoparticles may be a challenge.

One conventional method to prepare carbon particles for applications in electrochemical capacitor cell may involve using carbohydrate-based materials (xylose, cellulose, glucose and etc.) as precursor in a pressure vessel. Such a method may take very long periods, at least 30 hours to obtain carbon particles with sizes ranging from 40 nm to 1235 nm.

Another conventional method relates to preparing hydrothermal carbon materials from biomass via a two-step reaction. Copolymerizable compounds such as acrylic acid and acrylamidopropyl sulfonic acid may be incorporated into the biomass material to control the hydrothermal carbonization process. It takes 12 hours to obtain carbon particles from biomass precursors. The carbon particles synthesized may typically be in the range of 1 to 10 µm.

Yet another conventional method relates to preparing oxygen-scavenging particles. The oxygen scavenger may be composed of micro-sized iron particles, sodium chloride and acidifying components such as aluminum chloride. In order to prepare such oxygen scavengers, all the components are added into a mechanical mixing machine to achieve uniform mixing of components. However, the scavenging performance of the oxygen-scavenging particles is not reported.

A further conventional method relates to a method of preparing element-doped cerium oxide particles as oxygen scavengers. Cerium oxide particles doped with elements of at least one of yttrium (Y), calcium (Ca), and praseodymium (Pr) are disclosed. These cerium oxide particles are formed by firing a composite oxide of cerium oxide containing a dopant element at 1400° C. or higher temperatures for about 1 hour. After activation in a reducing gas (hydrogen) stream at 1000° C. for 1 hour, cerium oxide particles show good oxygen scavenging performance. The preparation process of cerium oxide particles may be dangerous and costly.

Various embodiments may provide a method of forming one or more composite structures. Various embodiments may provide a method of forming one or more composite structures, each of the one or more composite structures including carbon (C) and iron (Fe). Various embodiments may provide a method for mass production of Fe/C nanoparticles for applications in food packaging. Various embodiments may involve the addition of a suitable ratio of monopotassium phosphate ($KH_2PO_4$) during the large-scale synthesis of carbon nanoparticles, which may lead to desirable nanoparticles with high production yield within 1 hour. Various embodiments may involve use of spray dry machine and the addition of glucosamine, which may produce Fe/C with higher iron content. Glucosamine may also aid in achieving nanosized Fe particles on the carbon support to produce the desirable structure for scavenging oxygen.

FIG. 1 shows a schematic illustrating a method of forming one or more composite structures according to various embodiments. The method may include, in 102, forming one or more carbon structures from a carbon source via a hydrothermal process. The method may also include, in 104, introducing iron onto the carbon structures to form the one or more composite structures including carbon and iron.

In other words, the method may involve using a hydrothermal process to form one or more carbon structures, i.e. carbon carriers. The carbon in the one or more carbon structures may be derived from a carbon source. The method may further include providing iron onto the carbon structures to form the composite structures.

A hydrothermal process may involve crystallizing substances, e.g. carbon particles or spheres, from high-temperature aqueous solutions or mixtures at high vapor pressures.

In various embodiments, the composite structure may be substantially spherical in shape. The composite structure may be a particle, e.g. a nanoparticle. In the current context, a nanoparticle may be a particle having a diameter less than 1000 nm.

Each carbon structure of the one or more carbon structures may be a carbon particle, e.g. a carbon nanoparticle. In various embodiments, each carbon particle may be spherical, and may be referred to as a carbon sphere.

The carbon source may be a biomass material. The biomass material may be any one selected from a group consisting of D-(+)-glucose, D-(+)-glucosamine hydrochloride, and combination thereof. The biomass material may be any monosaccharide or a mixture including any monosaccharide.

In various embodiments, forming the one or more carbon structures from the carbon source further may include introducing a seeding additive to the carbon source. The seeding additive may be a potassium salt or a phosphate salt. In various embodiments, the seeding additive may be monopotassium phosphate ($KH_2PO_4$). Seeding additives such as monopotassium phosphate may act as a catalyst to generate more carbon structures, such as carbon particles or spheres, and may improve the yield of the one or more carbon structures, while reducing the size of each carbon structure.

Introducing the seeding additive to the carbon source may include forming a mixture or solution including the carbon source, e.g. a glucose solution, and adding the seeding additive to the mixture or solution including the carbon source. For instance, the D-(+)-glucose may be dissolved in solution and monopotassium phosphate may be added to the solution including the D-(+)-glucose.

In various embodiments, the method may involve forming an additive mixture or solution, and mixing the additive solution and the mixture or solution including the carbon source. For instance, the D-(+)-glucose and the monopotassium phosphate may be respectively dissolved in solution.

In various embodiments, the mixture or solution including the carbon source may further include a suitable solvent such as water, e.g. deionized water. The carbon source may be dissolved in the suitable solvent.

The seeding additive may have a concentration of any one value selected from a range from 0.01 weight percent (wt %) to 10 weight percent (wt %), e.g. 0.1 weight percent to 0.5 weight percent, relative to a mass of the carbon source, e.g. glucose source, which may be taken as 100 weight percent. In other words, the seeding additive may be any one value selected from a range from 0.01% to 10% by weight, or 0.1% to 0.5% by weight relative to the carbon source. The ratio of a mass of the seeding additive to a mass of the one or more carbon source may range from 0.01:100 to 10:100, e.g. 0.1:100 to 0.5:100. For instance, 0.1 wt % to 0.5 wt % of additive to glucose source may refer to 0.1 grams to 0.5 grams of additive per 100 grams of glucose.

The hydrothermal process may be carried out at any temperature range from 180° C. to 210° C. A dwell time of the hydrothermal process may be equal or less than an hour (0-1 hour). The hydrothermal process may be carried out using a Parr Stirred High Pressure Reactor. The mixture or solution including the carbon source may be stirred. The stirring rate may be any one value selected from a range from 0 revolutions per minute (rpm) to 100 revolutions per minute (rpm), preferably from 10 to 100 rpm, further preferably from 10 to 50 rpm to provide more uniformly spherical carbon particles.

The amount of mixture solution heated or processed per hydrothermal process or reaction may be any one value selected from a range from 1 litre to 3 litres, preferably from 1.5 litres to 2.5 litres.

Other pressure reactors may also be used for the hydrothermal process, with the amount of solution processed ranging from 10 millilitres (ml) to 10 litres, or even 100 litres or larger.

The measured pressure at 180° C. may be from about 135 pounds per square inch (PSI) to about 150 pounds per square inch (PSI). The measured pressure at 210° C. may be from about 265 pounds per square inch (PSI) to about 280 pounds per square inch (PSI).

Each carbon particle may have a size or diameter of any one value selected from a range from 50 nanometres (nm) to 1 micrometre (μm). The yield of carbon particles may be at or over 20%, e.g. from 20% to 80%, e.g. about 50%.

In various embodiments, iron included in the one or more composite structures may be any one value selected from a range from 1 weight percent to 80 weight percent relative to carbon included in the one or more composite structures, which may be taken as 100 weight percent. In other words, a ratio of iron to carbon may range from 1:100 to 80:100. The iron included in the one or more composite structures may be any one value selected from a range from 1% to 80% by weight relative to carbon.

Introducing iron onto the one or more carbon structures to form the one or more composite structures may include dissolving an iron salt in a suitable solvent to form a precursor solution. Introducing iron onto the one or more carbon structures to form the one or more composite structures may further include mixing the precursor solution and a suspension or mixture including the one or more carbon structures to form a resultant mixture. The suspension or mixture including the one or more carbon structures may be formed by addition of the one or more carbon structures and a suitable solvent or liquid. The iron salt may be one or more selected from a group consisting of iron nitrate, iron chloride, iron sulfate, iron gluconate, iron citrate, and iron oxalate.

Introducing iron onto the one or more carbon structures to form the one or more composite structures may further include drying the resultant mixture including the iron salt and the one or more carbon structures. Drying the resultant mixture may be carried by spray drying, rotary evaporation, freeze drying, air drying or vacuum drying at room temperature, to form dried or partially dried composite structures. The dried or partially dried composite structure may be further or completely dried at any one temperature selected from a range from 60° C. to 80° C.

The method may also include adding an anti-agglomeration additive to the resultant mixture before drying the resultant mixture. The anti-agglomeration additive may be any one selected from a group consisting of glucosamine, melamine, and a combination thereof. The anti-agglomeration additive may help achieve high loading of iron on the carbon particles, and may help to prevent or reduce agglomeration or aggregation.

The anti-agglomeration additive may have a concentration of any one value selected from a range from 1 weight percent to 50 weight percent relative to a mass of carbon particles, which may be taken as 100 weight percent. In other words, the amount of anti-agglomeration additive to the amount of carbon may range from 1:100 to 50:100. The anti-agglomeration additive may be any one value selected from a range from 1% to 50% by weight relative to carbon particles.

In various embodiments, introducing iron onto the one or more carbon structures to form the one or more composite structures may further include reducing the iron salt by heating the resultant mixture in a pyrolysis process.

The resultant mixture may be heated in an environment of any one selected from a group consisting of nitrogen, argon, and a mixture of hydrogen and nitrogen.

In various embodiments, the resultant mixture may be heated in an environment of the mixture of hydrogen and nitrogen. The hydrogen may be any one value from 1% to 10% by volume relative to nitrogen, which may be taken as 100%. In other words, a ratio of hydrogen to nitrogen may range from 1:100 to 10:100. In various embodiments, the hydrogen may be 5% by volume relative to nitrogen.

In various embodiments, a temperature of the pyrolysis process is any one value selected from a range from 500° C. to 900° C.

Various embodiments may provide a composite structure formed according to any one method described herein.

Figure 2:
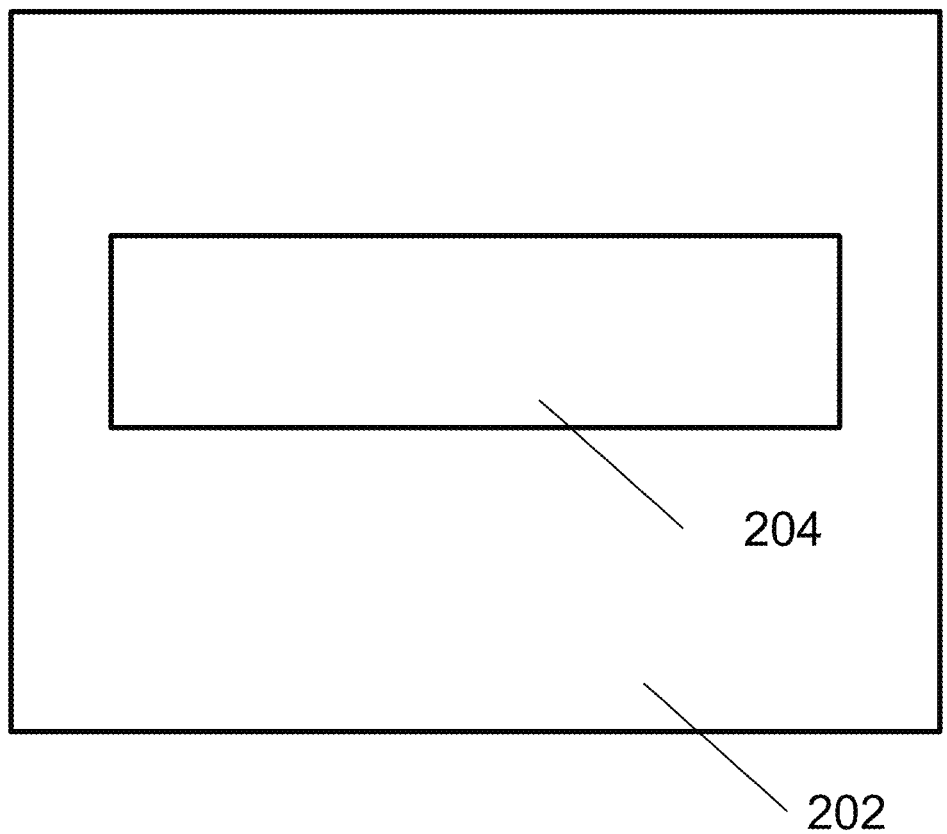
FIG. 2 shows a general illustration of a composite structure according to various embodiments.

FIG. 2 shows a general illustration of a composite structure 200 according to various embodiments. The composite structure 200 may be a composite particle. The composite structure may include a matrix or support 202 including carbon, and one or more nanostructures 204 including iron. The one or more nanostructures 204 may be adhered onto or at least partially embedded in the matrix or support 202. The one or more nanostructures 204 may be nanoparticles. The one or more nanostructures 204 may be on a surface of the matrix or support 204.

In various embodiments, the composite structure 200 may be substantially spherical in shape. The composite structure 200 may be a particle, e.g. a nanoparticle. In various embodiments, each nanostructure of the one or more nanostructures 204 may be substantially spherical in shape. In various embodiments, the composite structure 200 may include a carbon sphere matrix or support 202 with isolated iron nanoparticles 204.

The iron included in the one or more nanostructures 204 may be iron metal. In other words, the iron included in the one or more nanostructures 204 may have a valency of 0. The carbon included in or on the support or matrix 202 may also have a valency of 0.

In various embodiments, the composite structure 200 may have a size or diameter of any one value selected from a range from 50 nm to 1 μm. In various embodiments, the composite structure 200 may have a size or diameter of about 300 nm.

In various embodiments, each nanostructure of the one or more nanostructures 204 may have a size or diameter of less than 50 nm, e.g. less than 20 nm. Each nanostructure of the one or more nanostructures 204 may have a size or diameter of more than 0.1 nm.

FIG. 3 shows a schematic illustrating a method of forming one or more composite structures according to various embodiments. The method may include, in 302, a hydrothermal process or reaction for large-scale synthesis of carbon nanoparticles. The method may also include, in 304, a spray dry process. The method may also include, in 306, a carbonization or pyrolysis step.

A Parr Stirred High Pressure Reactor (3.75 litres) may be used in the hydrothermal process according to various embodiments.

The hydrothermal treatment process may occur at a temperature range of 180-210° C. for dwell time between 0-1 hour. The synthesis time, excluding time for heating up, may be from 0 min to 30 min. The stirring rate may be between 0 rpm to 200 rpm, preferably at 10-100 rpm, further preferably at 10-50 rpm to provide uniform spherical particles. The amount of solution per reaction may be between 1 to 3 litres, preferably between 1.5 to 2.5 litres. Various embodiments may use other similar pressure reactors from 10 ml to 10 litres scale or 100 litres or even larger. The measured pressure at 180° C. may be around 135 PSI to around 150 PSI. The measured pressure at 210° C. may be around 265 to around 280 PSI.

Figure 4A:
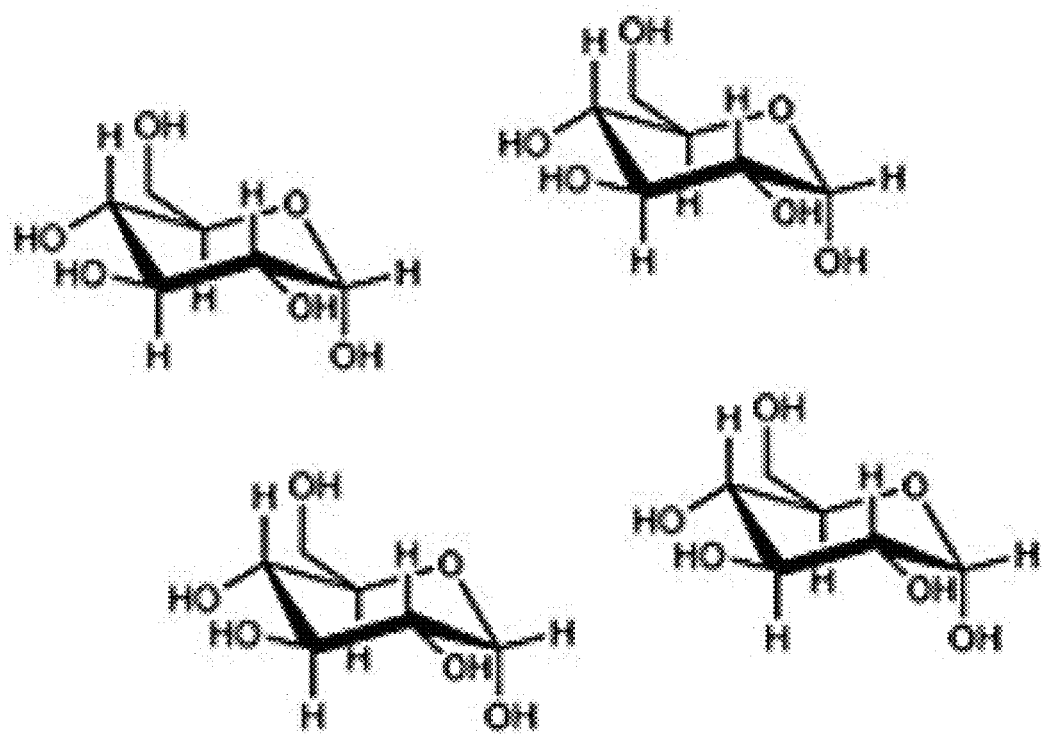
FIG. 4A is a schematic showing glucose molecules in a high pressure reactor according to various embodiments.
Figure 4B:
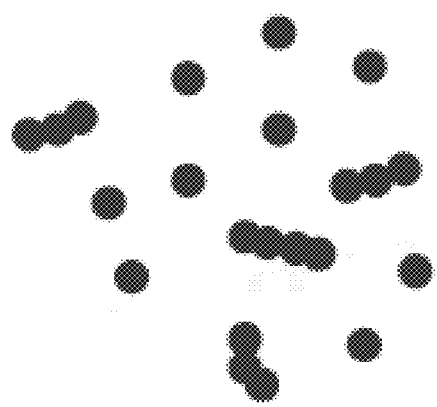
FIG. 4B shows is a schematic showing carbon nanoparticles formed from glucose molecules shown in FIG. 4A using dehydration and polymerization according to various embodiments.
Figure 4C:
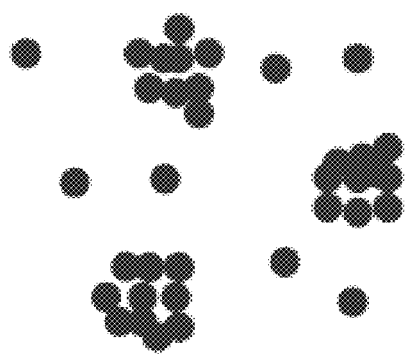
FIG. 4C shows agglomeration of the carbon nanoparticles shown FIG. 4B to form carbon particles according to various embodiments.
Figure 4D:
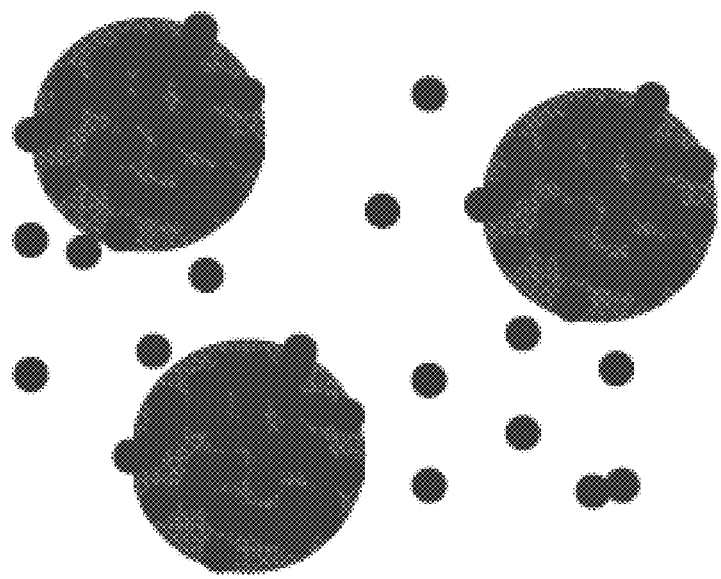
FIG. 4D shows growth or carbon particles or spheres according to various embodiments from the agglomerated carbon nanoparticles shown in FIG. 4C.
Figure 4E:
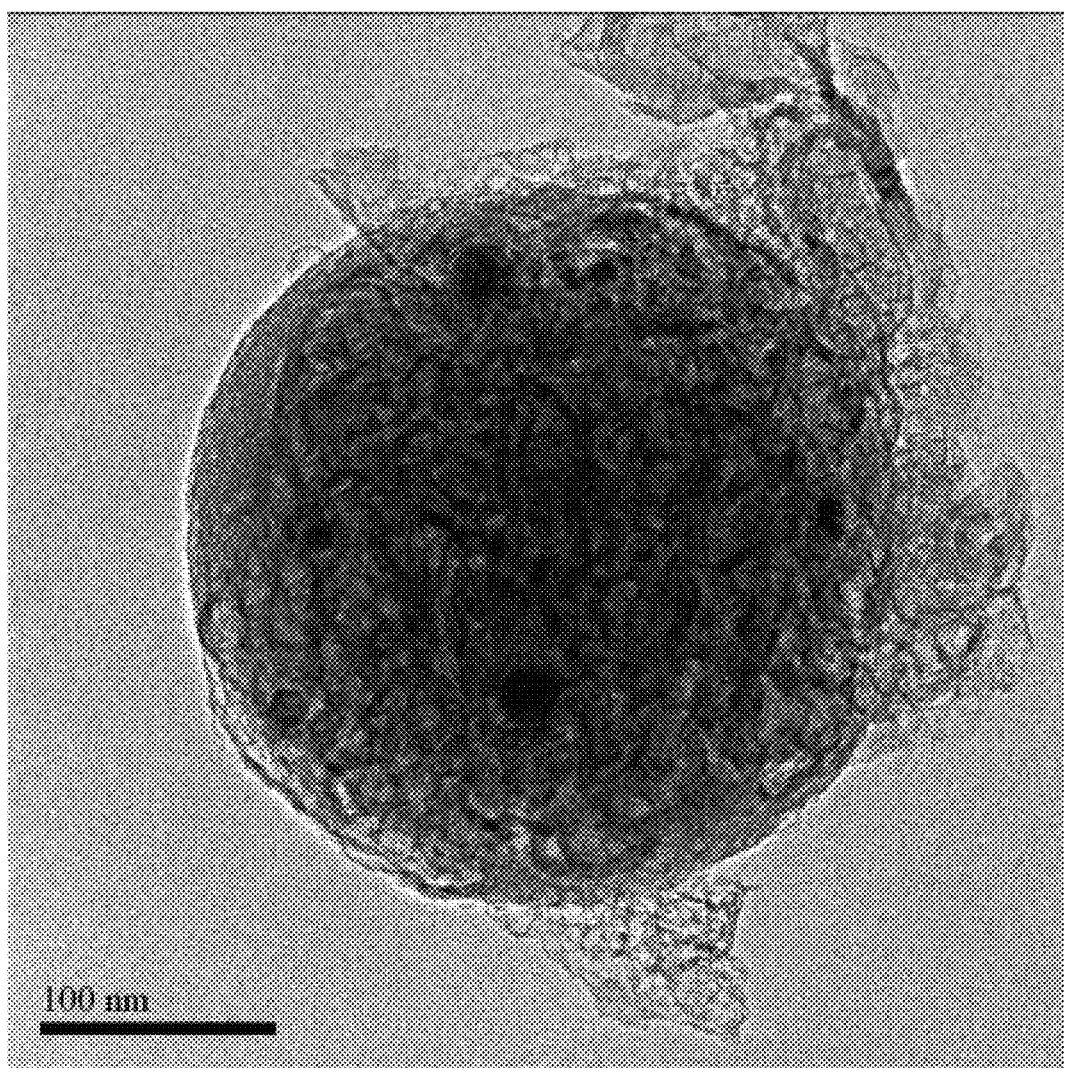
FIG. 4E shows a transmission electron microscopy (TEM) image of a composite particle according to various embodiments.

FIGS. 4A-4D show forming of carbon particles according to various embodiments. FIG. 4A is a schematic showing glucose molecules in a high pressure reactor according to various embodiments. FIG. 4B shows is a schematic showing carbon nanoparticles formed from glucose molecules shown in FIG. 4A using dehydration and polymerization according to various embodiments. FIG. 4C shows agglomeration of the carbon nanoparticles shown FIG. 4B to form carbon particles according to various embodiments. FIG. 4D shows growth or carbon particles or spheres according to various embodiments from the agglomerated carbon nanoparticles shown in FIG. 4C. Several carbon nanoparticles may be agglomerated to form a larger carbon particle. FIG. 4E shows a transmission electron microscopy (TEM) image of a composite particle according to various embodiments. The composite particle may be referred to as an iron-carbon (Fe/C) hybrid particle.

Factors for controlling the growth of carbon particles may include temperature, time, and/or concentration of the carbon source (e.g. glucose).

The glucose molecules may be D-(+)-glucose. In various embodiments, the D-(+)-glucose may be kept constant, and a seeding additive such as monopotassium phosphate (0.1%-1 wt %) may be added. The carbon particles formed may each be spherical with a size or diameter range of 50 nm to 1 μm, with a yield above 20%, e.g. from 20% to 80%, e.g. about 50%. In various embodiments, to achieve carbon particles with a size or diameter of less than 250 nm, the yield of carbon nanoparticles may be less than 10% without addition of monopotassium phosphate ($KH_2PO_4$).

It is appreciated that for the same carbon particle size, the yield of the carbon particles may increase to more than 23% with the addition of $KH_2PO_4$ within a shorter dwell time. FIG. 5 is a table showing the size and carbon (C) yield of the carbon particles at 200° C. and 210° C., for dwell times from 0 minute to 30 minutes according to various embodiments.

The reaction may be stopped immediately when reactor temperature reaches setting temperature (i.e. dwell time of 0 min for dwell time) or may be dwelled (i.e. held) for another 20 min or 30 min. The dwell time may be defined as the hold time starting from the time in which the reactor temperature reaches the setting temperature. The temperature of the reactor may increase up to the setting temperature, and may stay at the setting temperature for a duration equal to the dwell time. The setting temperature may be the temperature in which the reactor is set at for forming the carbon particles.

The yield may be calculated based on the carbon yield for the hydrothermal process. The yield may be equal to the weight of the dried carbon particles divided by the theoretical weight of carbon in the carbon source or carbon precursor, and multiplied by 100.

It is found that the size and yield of carbon nanoparticles may be related to the content of $KH_2PO_4$.

Figure 6:
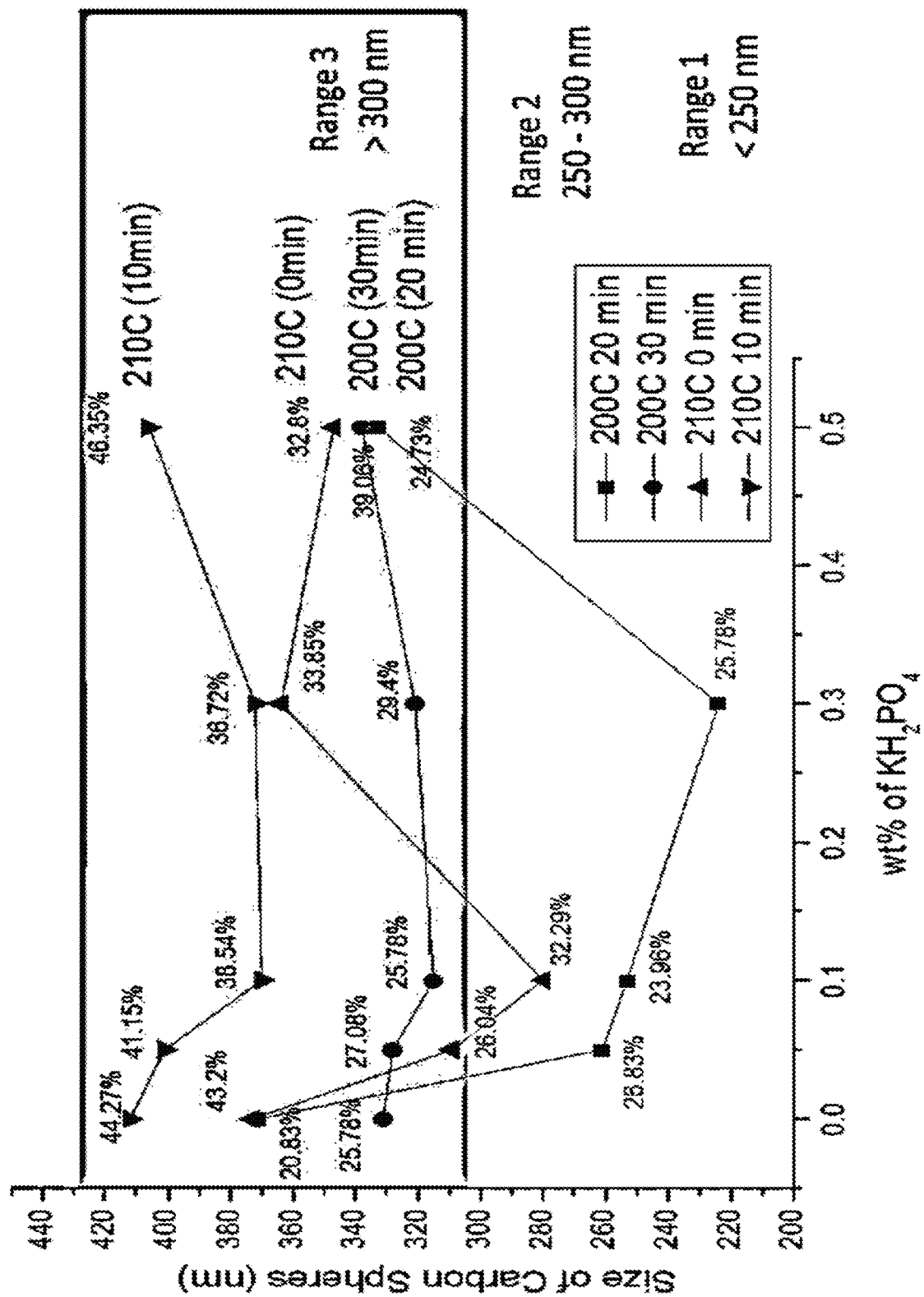
FIG. 6 is a plot of size of carbon spheres (in nanometers or nm) as a function of the weight percent (wt %) of monopotassium phosphate ($KH_2PO_4$) demonstrating the effect of the addition of monopotassium phosphate ($KH_2PO_4$) according to various embodiments.

FIG. 6 is a plot of size of carbon spheres (in nanometers or nm) as a function of the weight percent (wt %) of monopotassium phosphate ($KH_2PO_4$) demonstrating the effect of the addition of monopotassium phosphate ($KH_2PO_4$) according to various embodiments. At 0 weight percent (wt %) of monopotassium phosphate ($KH_2PO_4$), the carbon spheres are formed without addition of monopotassium phosphate ($KH_2PO_4$), and may be generally larger with a lower yield. FIG. 6 shows the trend on the influence of $KH_2PO_4$ salt to tune at the size of the carbon spheres at the same process condition. The addition of 0.1 wt % of $KH_2PO_4$ cause a reduction of the carbon spheres size in all scenarios. The $KH_2PO_4$ may serve as catalyst to generate more seeds for carbon spheres formation, thus reducing the size and improving the yield. There may be a range for achieving small carbon nanoparticles with high yield. The effect of $KH_2PO_4$ on the production yield of carbon nanoparticles with similar sizes may be shown in FIG. 7. FIG. 7 is a table showing the yield of carbon particles under different hydrothermal conditions and with or without addition of monopotassium phosphate ($KH_2PO_4$) according to various embodiments. The percentage increase of the yield with the addition of $KH_2PO_4$ may be at least 20%, and at least 60% under certain hydrothermal conditions.

In order to attain Fe/C hybrid nanoparticles, the iron particles may be uniformly adsorbed onto the carbon particles. It may be desired that the iron particles should generally have a size less than 50 nm and particularly less than 20 nm. The concentration of iron particles may be in the range of 10-90 wt %, based on the dry weight % of carbon particles, preferably in the range of 30-80 wt % and further preferably at 40-50 wt %. The iron salts may include one or more selected from the group consisting of iron nitrate, iron chloride, iron sulfate, iron gluconate, iron citrate and iron oxalate. It may be preferred that the iron salts are dissolved in a solvent such as water. It may also be preferred that iron is impregnated onto the carbon surface by dissolving iron salt into carbon particle suspension. After sufficient immersion, the solvent may be removed by a drying process. The drying process may be carried out by spray dry, rotary evaporation, freeze drying, air drying, or vacuum drying at room temperature. The partially dried carbon particles may be further completely dried at 60° C.-80° C.

Figure 8A:
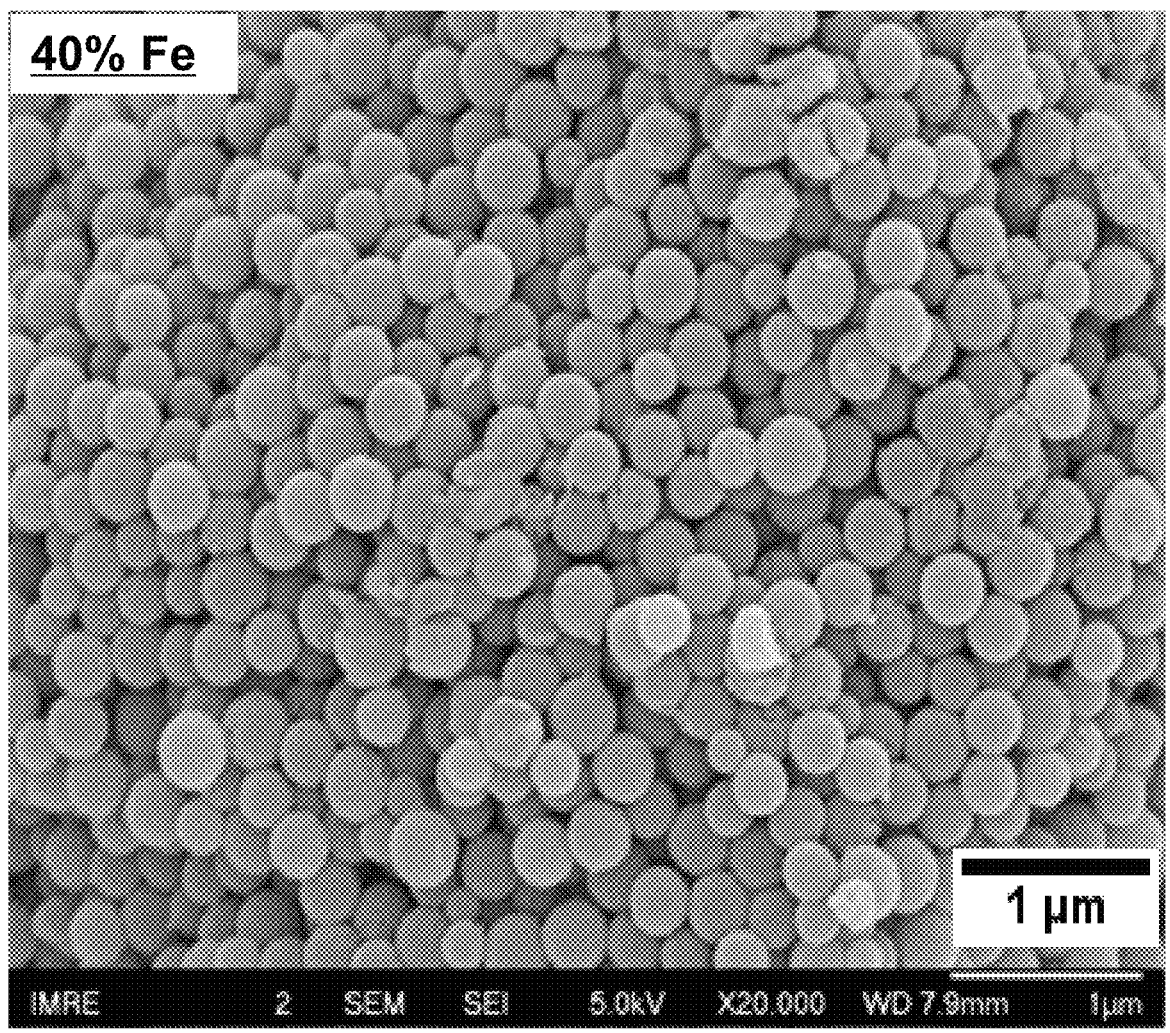
FIG. 8A shows a scanning electron microscope (SEM) image of iron-carbon (Fe/C) hybrid particles prepared with addition of glucosamine at 40 weight percent of iron according to various embodiments.
Figure 8B:
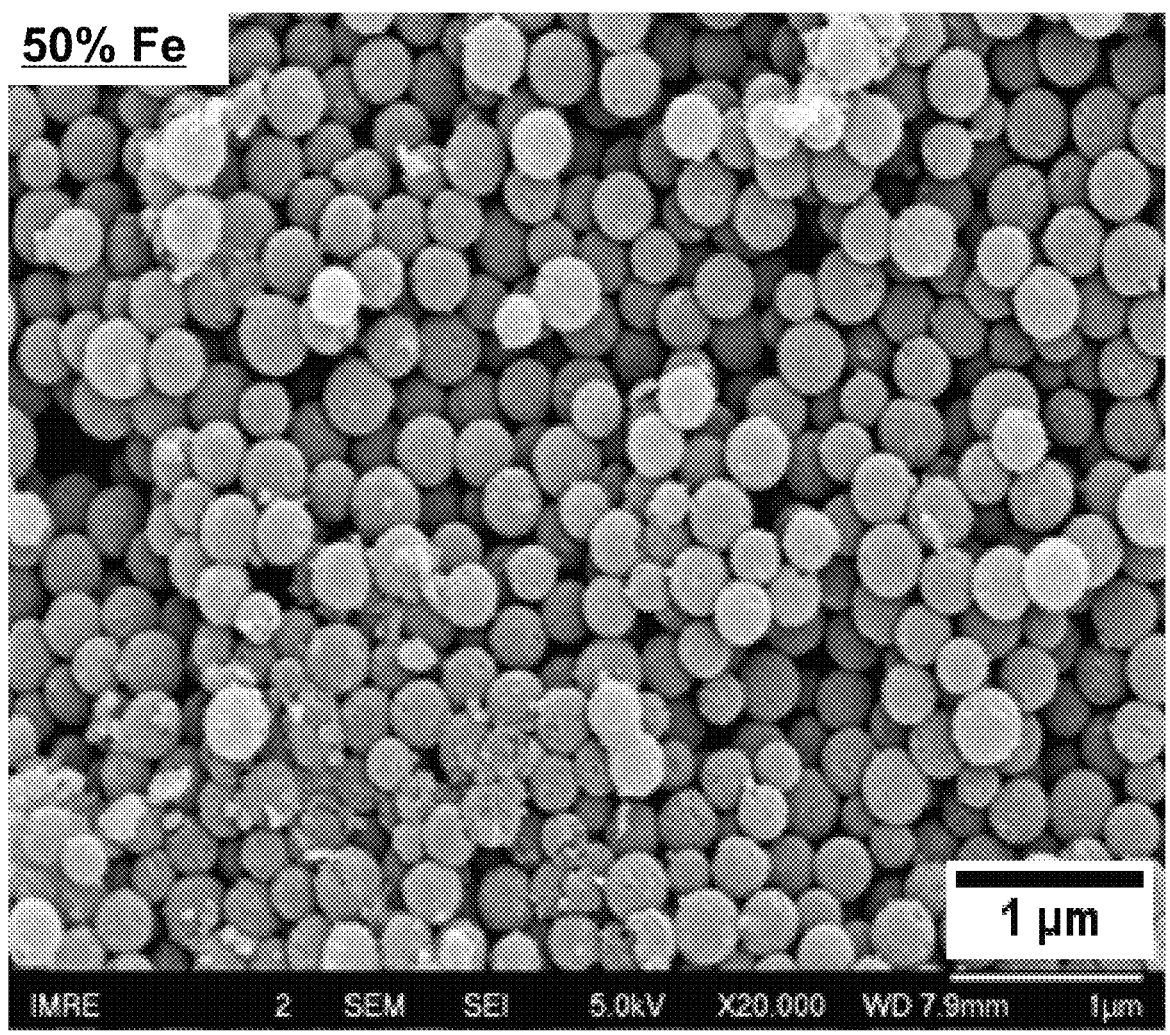
FIG. 8B shows a scanning electron microscope (SEM) image of iron-carbon (Fe/C) hybrid particles prepared with addition of glucosamine at 50 weight percent of iron according to various embodiments.
Figure 8C:
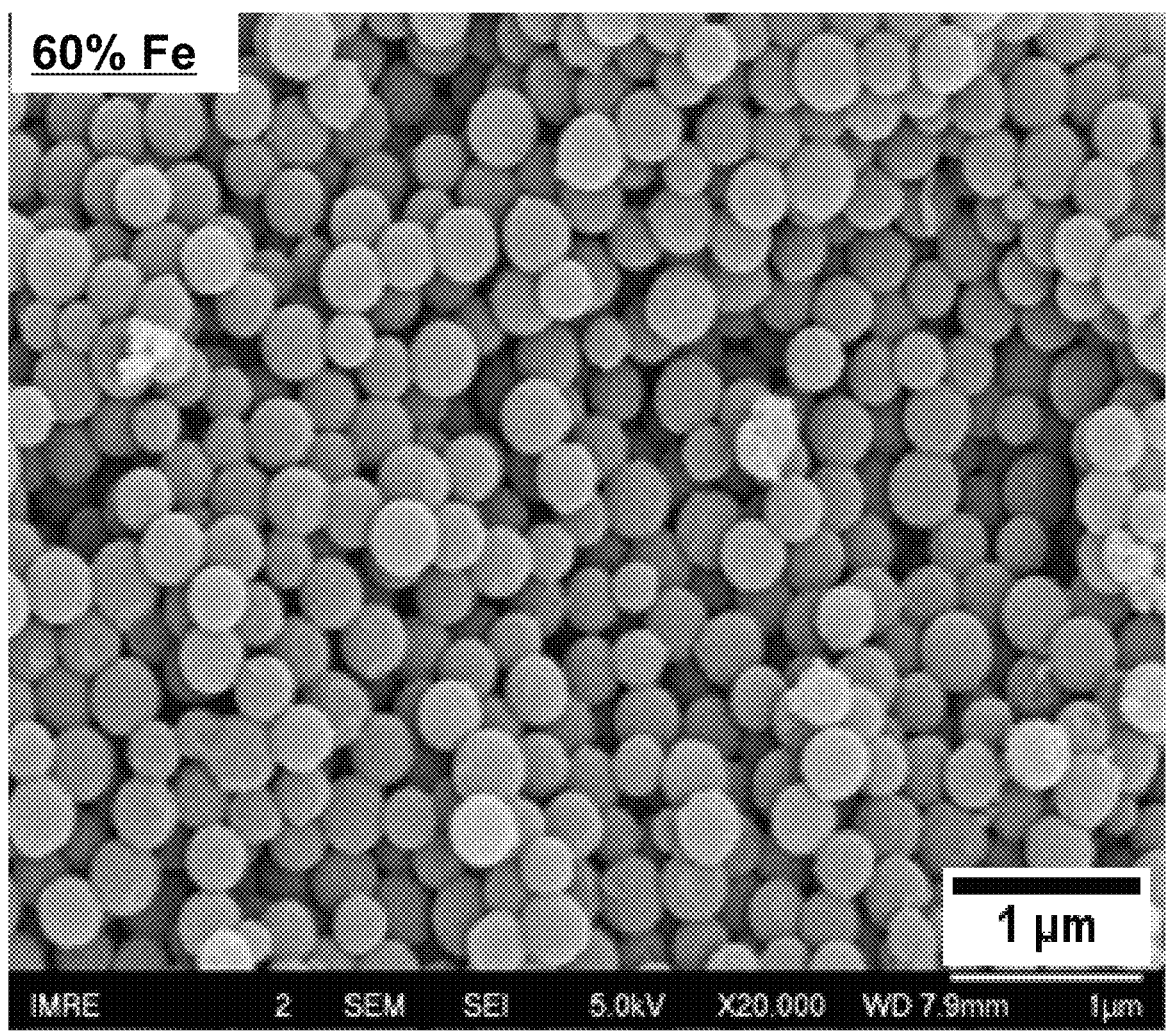
FIG. 8C shows a scanning electron microscope (SEM) image of iron-carbon (Fe/C) hybrid particles prepared with addition of glucosamine at 60 weight percent of iron according to various embodiments.
Figure 8D:
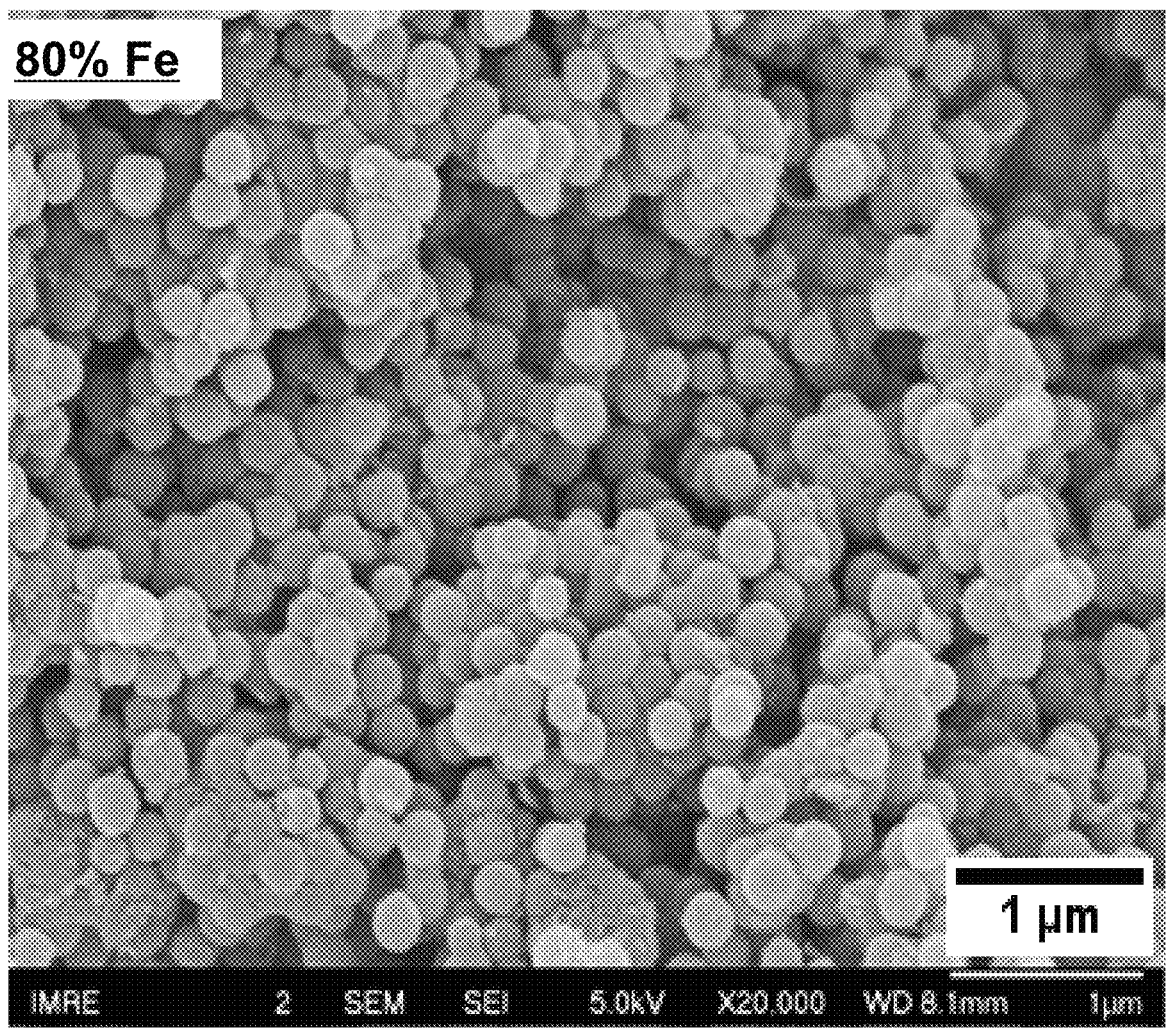
FIG. 8D shows a scanning electron microscope (SEM) image of iron-carbon (Fe/C) hybrid particles prepared with addition of glucosamine at 80 weight percent of iron according to various embodiments

In various embodiments, the spray dry approach, which is widely used in industry, may be preferably used in the drying process. In various embodiments, the drying process of 1 g of carbon with 50% of Fe may involve spray-drying at around 100° C. with flow rate in the range of 20-60 L/min. In order to achieve high loading of Fe on carbon nanoparticles and avoid aggregation of Fe nanoparticles thereon, glucosamine may be added into the mixture of carbon particles and iron salt before spray dry process. The weight of the glucosamine added may be any value between 5% to 50%, preferably between 10% to 40%, and more preferably at about 20% of the weight of carbon particles. FIG. 8A shows a scanning electron microscope (SEM) image of iron-carbon (Fe/C) hybrid particles prepared with addition of glucosamine at 40 weight percent of iron according to various embodiments. FIG. 8B shows a scanning electron microscope (SEM) image of iron-carbon (Fe/C) hybrid particles prepared with addition of glucosamine at 50 weight percent of iron according to various embodiments. FIG. 8C shows a scanning electron microscope (SEM) image of iron-carbon (Fe/C) hybrid particles prepared with addition of glucosamine at 60 weight percent of iron according to various embodiments. FIG. 8D shows a scanning electron microscope (SEM) image of iron-carbon (Fe/C) hybrid particles prepared with addition of glucosamine at 80 weight percent of iron according to various embodiments. The weight percent of carbon for the samples shown in FIGS.

8A-D may be taken as 100 wt %. The weight of glucosamine added is about 20% relative to the weight of the carbon particles (taken as 100%). Uniform Fe/C nanoparticles without aggregation may can be obtained even when the weight of the iron content increases up to 80% relative to the weight of the carbon particles.

Figure 8E:
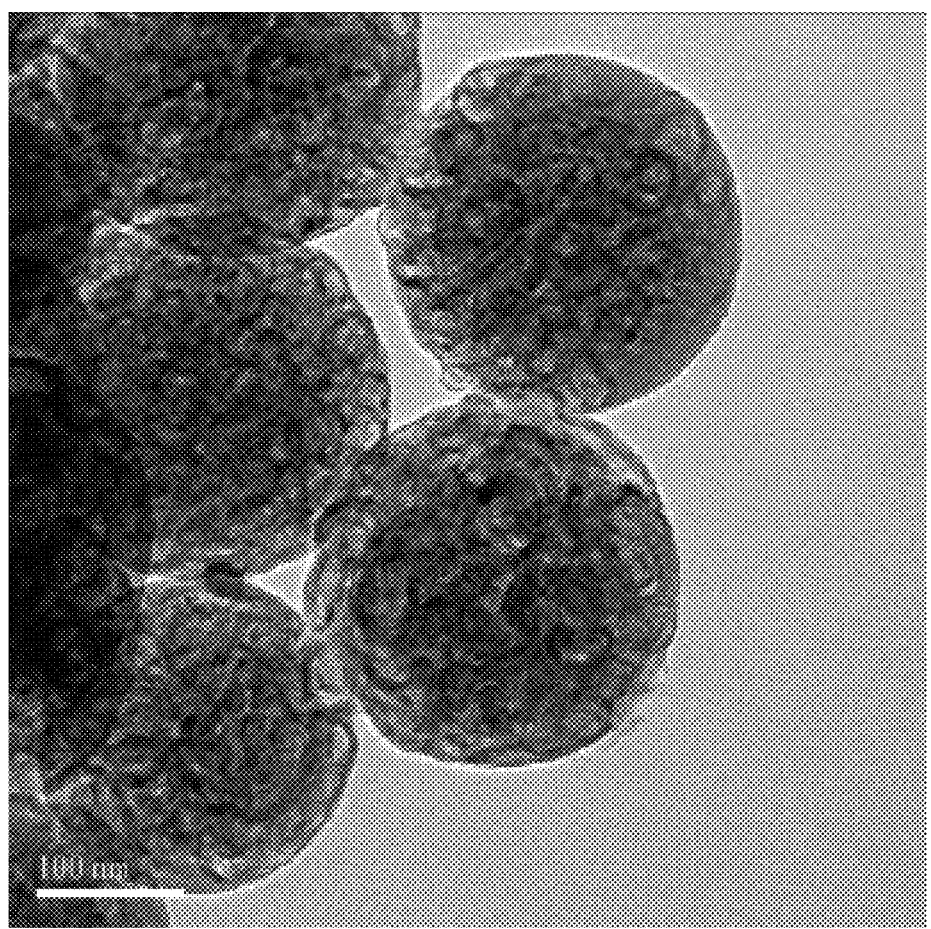
FIG. 8E shows a transmission electron microscopy (TEM) image of iron-carbon (Fe/C) hybrid particles with 80% weight percent iron and glucosamine content 20% of the iron according to various embodiments.

FIG. 8E shows a transmission electron microscopy (TEM) image of iron-carbon (Fe/C) hybrid particles with 80% weight percent iron and glucosamine content 20% of the iron (by weight) according to various embodiments.

The Fe nanoparticles may be evenly distributed on the surface of carbon spheres, as shown in FIG. 8E.

Figure 8F:
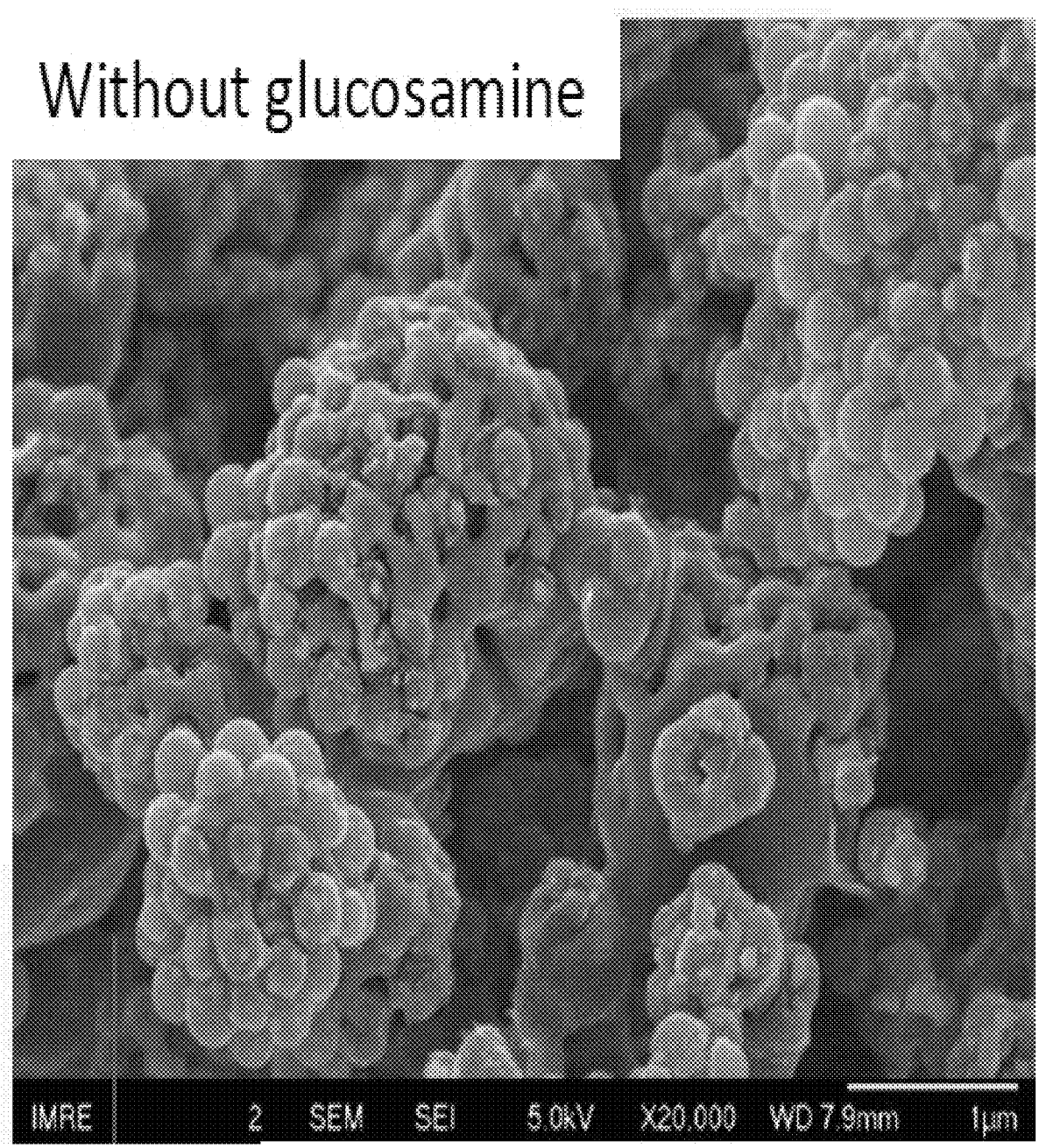
FIG. 8F shows a scanning electron microscope (SEM) images of iron-carbon (Fe/C) hybrid particles prepared without addition of glucosamine according to various embodiments.
Figure 8G:
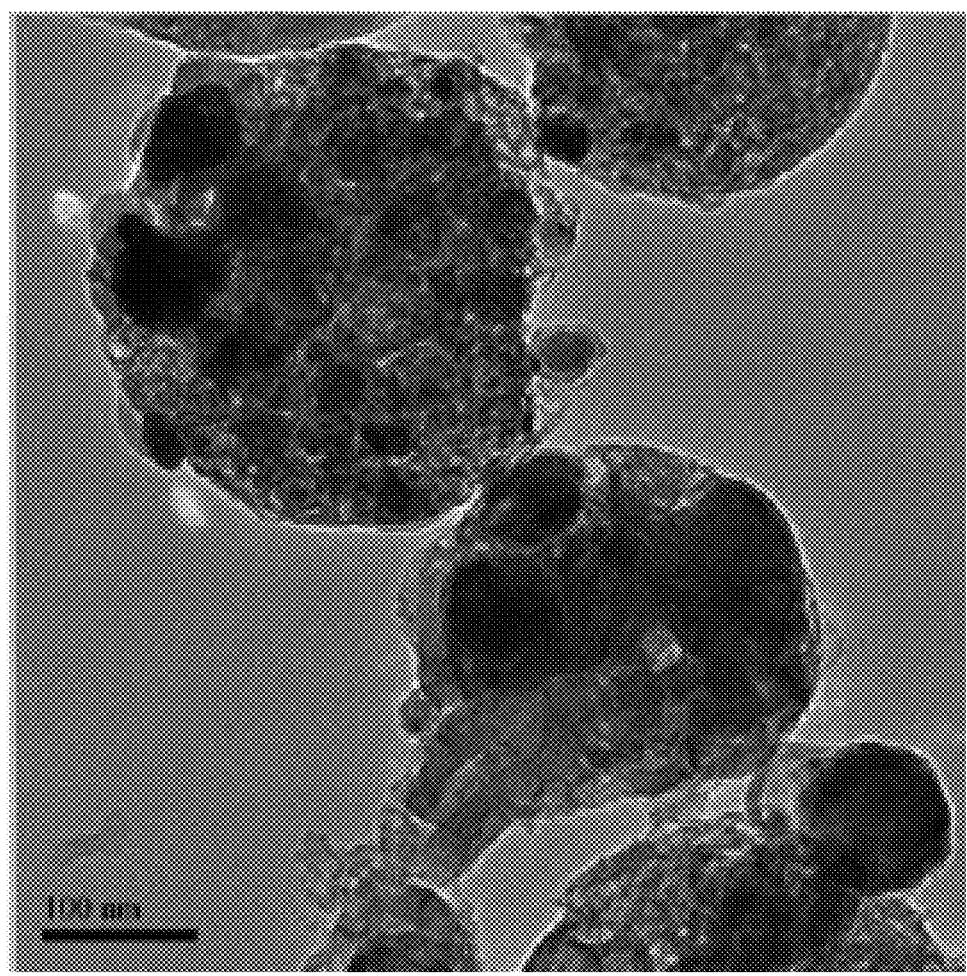
FIG. 8G shows a transmission electron microscopy (TEM) image of iron-carbon (Fe/C) hybrid particles without addition of glucosamine according to various embodiments.

FIG. 8F shows a scanning electron microscope (SEM) images of iron-carbon (Fe/C) hybrid particles prepared without addition of glucosamine according to various embodiments. FIG. 8G shows a transmission electron microscopy (TEM) image of iron-carbon (Fe/C) hybrid particles without addition of glucosamine according to various embodiments. The particles shown in FIGS. 8F and 8G have 80 weight percent of iron. The TEM images of FIGS. 8E and 8G show that smaller iron nanoparticles may be obtained with the addition of glucosamine.

In the method of preparing the nanostructured Fe/C particles according to various embodiments, the iron salts may have to be fully reduced to zero-valent iron particles. It may be performed at high temperature ranging from 400-1000° C., preferably at 500-900° C., and particularly preferably at about 500° C. In various embodiments, the pyrolysis process may be performed under a nitrogen gas or an argon gas or a forming gas. In various embodiments, at 500° C., the pyrolysis period may have to be about 12 hours to fully reduce iron salt to zero-valent iron particles. In various embodiments, time and temperature may be decreased or reduced in a pyrolysis process using a forming gas condition.

Preparation of Carbon Particles with Tunable Size and Improved Yield

Control experiment without $KH_2PO_4$: 180 g of D-(+)-glucose (>99.5%, GC) obtained from Sigma Aldrich was dissolved in 1500 ml of deionised water and stirred at room temperature for 30 min. The mixed solution was then transferred into a Parr high pressure reactor (3.75 litres in capacity). The reactor was heated to 180° C.-200° C., for a period of 30-180 min, and then allowed to cool to room temperature. The particles were then washed with deionised water for 3 times, by centrifugation at 9000 rpm for 15 minutes each.

Experiment with $KH_2PO_4$: 180 g of D-(+)-glucose (>99.5%, GC) obtained from Sigma Aldrich was dissolved in 1500 ml of deionised water and stirred at room temperature for 30 min. 0.05 wt %-0.5 wt % of $KH_2PO_4$ was added and stirred for additional 5 minutes. The mixed solution was then transferred into a Parr high pressure reactor (3.75 litres in capacity). The reactor was heated to 200° C.-210° C., for a period of 0 minute-30 minutes, and then allowed to cool to room temperature. The particles were then washed with deionised water for 3 times, by centrifugation at 9000 rpm for 15 minutes each.

The size and yield results of some of the samples are presented in FIGS. 5-7.

Oxygen Scavenging Performance of Fe/C Hybrid Particles With and Without $KH_2PO_4$.

The carbon particles were prepared with accordance to the method described above. The reaction was heated to 200° C. and kept for 20 minutes. A total of 5 different carbon particles were prepared after 5 reactions (carbon particles with 0%, 0.05%, 0.1%, 0.3%, 0.5% of $KH_2PO_4$). Iron (III) nitrate nonahydrate solution was then added into carbon particle suspension and stirred at 700 rpm for overnight. 1 g of carbon particle with 3.6 g of iron(III) nitrate nonahydrate give 50% of Fe. The water was removed by spray dry process. The powder of Fe/C were then placed in a quartz tube inside a tube furnace and heated to 800° C. with ramp rate of 5° C./min, under inert environment. The sample was kept at 800° C. for 3 hours. After that, the samples were allowed to cool to ambient temperature under inert environment before removing from the tube furnace. The as-synthesized nanostructured Fe/C particles were mixed with aqueous solution containing 0.01 g NaCl and the samples were dried in oven under inert environment. The oxygen scavenging test of samples was conducted at relative humidity of 100% and the performance is shown in FIG. 9.

FIG. 9 shows a table listing the scavenging capacities (in per gram (g) of iron (Fe)) of the composite particles according to various embodiments. The composite particles may have 0%, 0.05%, 0.1%, 0.3%, and 0.5% of $KH_2PO_4$.

Preparation of Fe/C Hybrid Particles with Different Iron Content

Fe/C with different scavenging speeds and capacities were prepared by varying the concentration of Fe on the carbon particles. Carbon nanoparticles of 300 nm in diameter were prepared by hydrothermal process at 210° C. with 0.1% of $KH_2PO_4$. After purification by centrifugation, as-prepared carbon particles were added into an aqueous solution containing iron(III) nitrate nonahydrate and stirred at room temperature for 30 min. Glucosamine (20 wt % of Fe) was added into the mixture and the suspension was stirred at 700 rpm for overnight. The samples were dried using a spray dry machine. The Fe/C with different Fe content were then placed in a tube furnace and heated to 800° C. with ramp rate of 5° C./min, under inert environment. The sample was kept at about 800° C. for 3 hours.

After that, the sample was allowed to cool to ambient temperature under inert environment before removing from the tube furnace. The as-synthesized nanostructured Fe/C particles were mixed with aqueous solution containing NaCl (7.5 wt % of Fe/C) and the samples were dried in oven under inert environment. The oxygen scavenging test was conducted at relative humidity of 100%.

FIG. 10 is a table showing the oxygen concentration (in percent or %) of composite particles with different iron content with time (in hours or Hrs) according to various embodiments.

Figure 11:
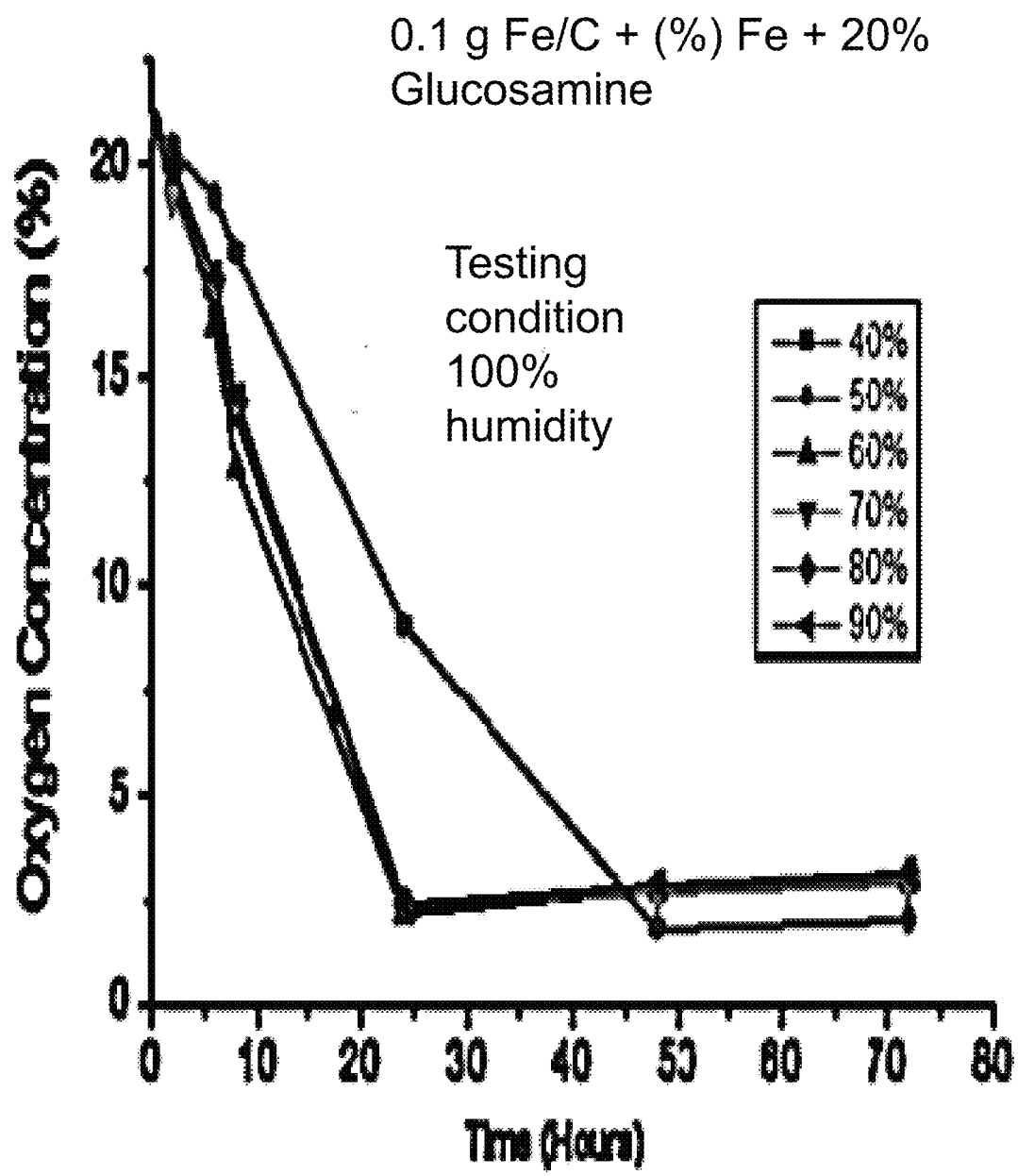
FIG. 11 is a plot of oxygen concentration (in percent or %) as a function of time (in hours) showing the oxygen scavenging performance of composite particles with different iron content according to various embodiments over 5 days.

FIG. 11 is a plot of oxygen concentration (in percent or %) as a function of time (in hours) showing the oxygen scavenging performance of composite particles with different iron content according to various embodiments over 5 days.

Figure 12:
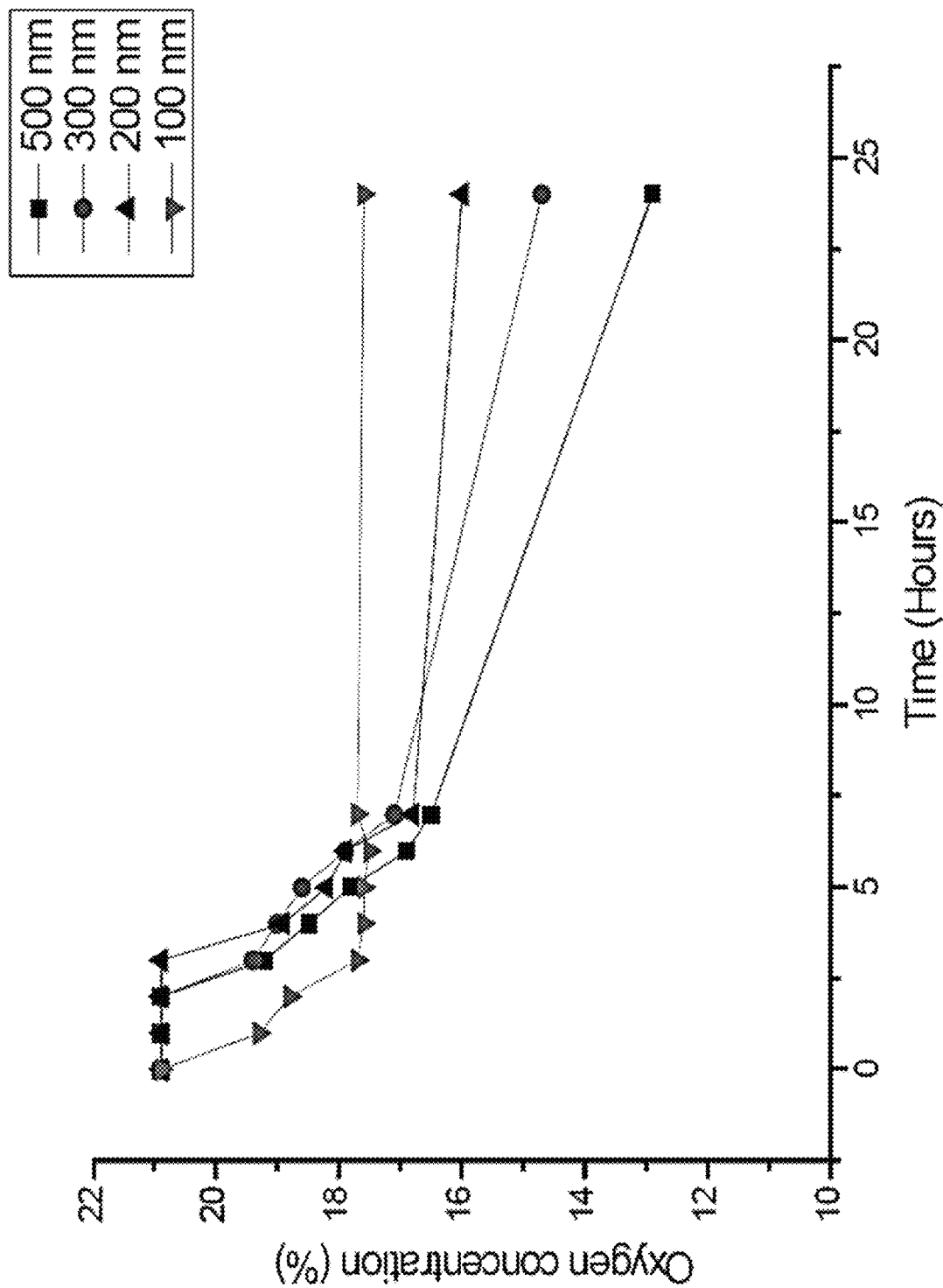
FIG. 12 is a plot of oxygen concentration (in percent or %) as a function of time (in hours) showing the oxygen scavenging performance of composite particles of different sizes according to various embodiments over time.

FIG. 12 is a plot of oxygen concentration (in percent or %) as a function of time (in hours) showing the oxygen scavenging performance of composite particles of different sizes according to various embodiments over time. It may be seen from FIG. 12 that the oxygen scavenging performance of Fe/C particles with size around 300 nm may be better than that of 100 or 200 nm as they can adsorb more oxygen. Meanwhile, Fe/C particles with size around 300 nm may have better transparency than the ones of 500 nm when they are integrated into films. Thus, carbon spheres with size around 300 nm may be preferred.

Oxygen Scavenging Performance of Fe/C Hybrid Particles at Different Carbothermal Temperatures Carbon nanoparticles of 300 nm were mixed with iron (III) nitrate nonahydrate solution (feeding ratio of Fe is 50 wt %), and then dried using the spray dry process. The sample was then annealed in tube furnace for different periods (ranging from 3 hours to 12 hours) at different temperatures (ranging from 500° C. to 900° C.) under inert environment.

Figure 14:
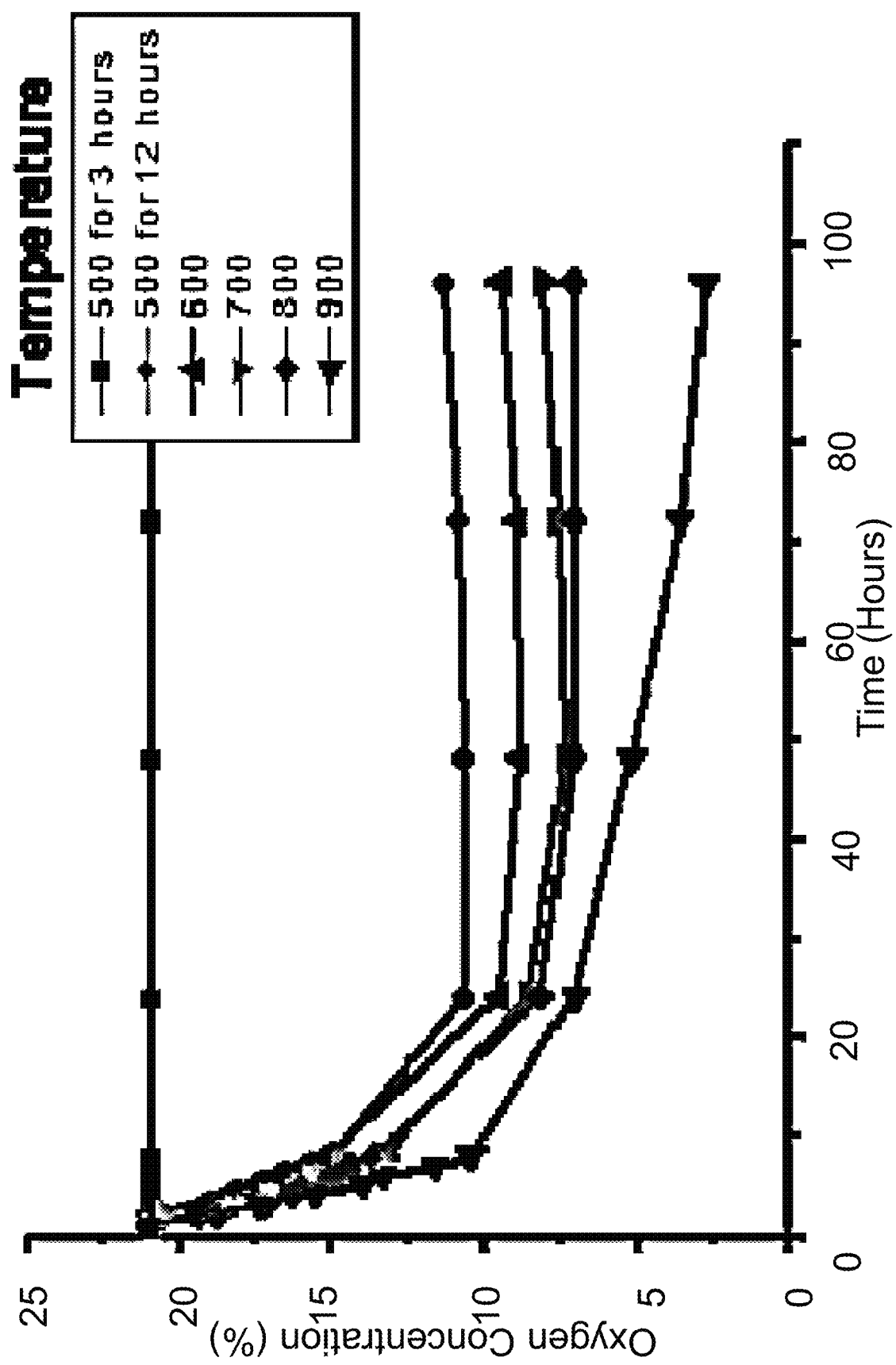
FIG. 14 is a plot of oxygen concentration (in percent or %) as a function of time (in hours) shows the scavenging properties of composite particles prepared by annealing in various different temperatures and durations according to various embodiments.

The ramping speed of furnace is set to 5° C./min. After that, the sample was allowed to cool to ambient temperature under argon before removing from the tube furnace. The as-synthesized nanostructured Fe/C particles were mixed with an aqueous solution containing sodium chloride (NaCl) (7.5 wt % of Fe/C) and the samples were dried in oven under inert environment. The oxygen scavenging test was conducted at relative humidity of 100% and the performance is shown in FIGS. 13-14. FIG. 13 is a table showing the oxygen concentration (in percent or %) of composite particles prepared by annealing in various different temperatures and durations with time (in hours or Hrs) according to various embodiments. FIG. 14 is a plot of oxygen concentration (in percent or %) as a function of time (in hours) shows the scavenging properties of composite particles prepared by annealing in various different temperatures and durations according to various embodiments. The lines which have not been indicated with an annealing duration represent samples annealed with a duration of 3 hours.

Oxygen Scavenging Performance of Fe/C Hybrid Particles Annealed in Forming Gas

Carbon nanoparticles of 300 nm were mixed with iron (III) nitrate nonahydrate solution (feeding ratio of Fe is 50 wt %) and then dried using the spray dry process. The Fe/C with different Fe content were then placed in a tube furnace and heated to 800° C. with ramp rate of 5° C./min, in forming gas.

Figure 16:
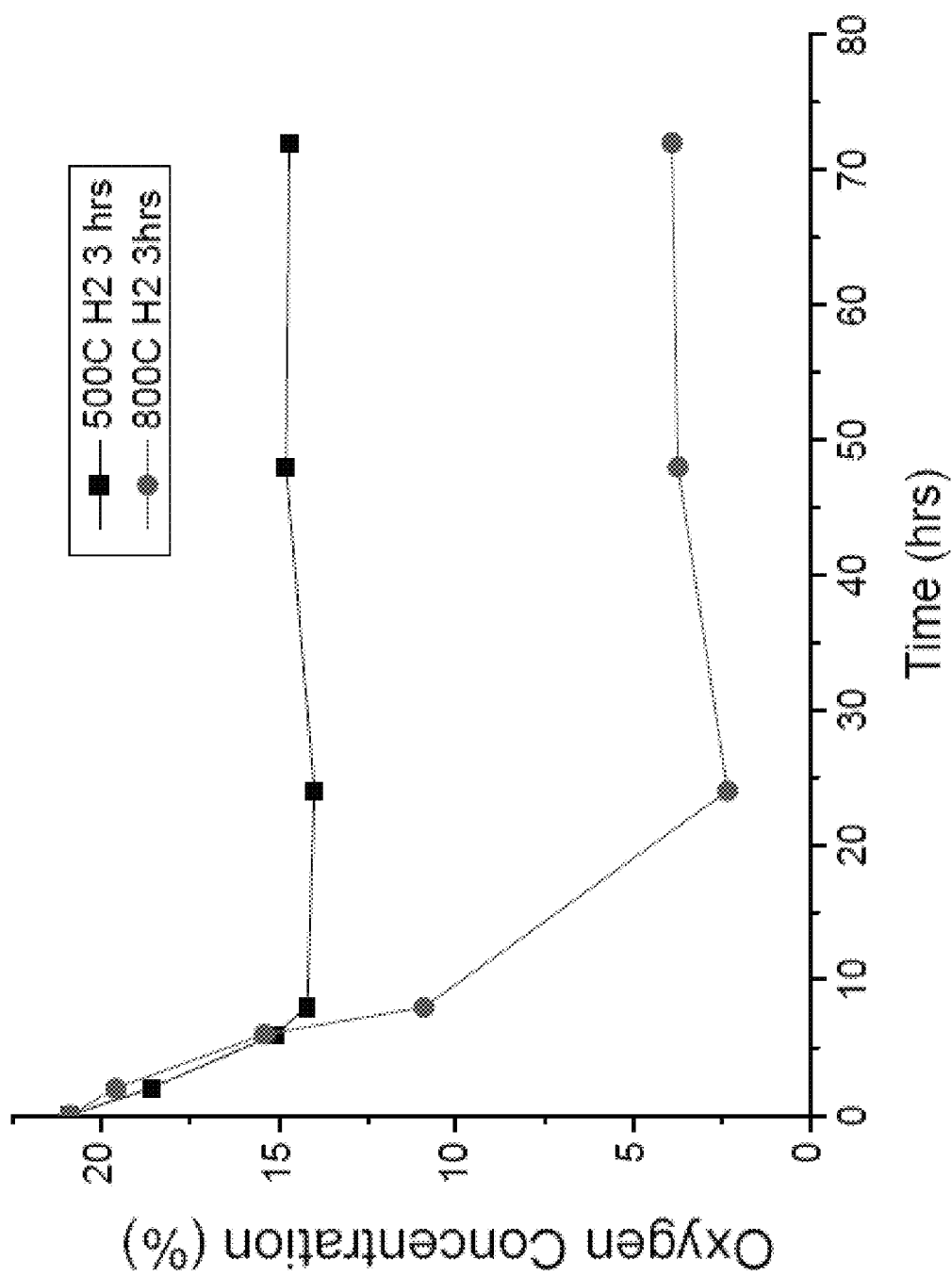
FIG. 16 is a plot of oxygen concentration (in percent or %) as a function of time (in hours or hrs) showing the oxygen scavenging property of composite particles prepared by annealing in forming gas at different temperatures according to various embodiments.

The sample was kept at 800° C. for 3 hours. The sample was allowed to cool to ambient temperature under argon before removing from the tube furnace. The as-synthesized nanostructured Fe/C particles were mixed with an aqueous solution containing NaCl (7.5 wt % of Fe/C), and the samples were dried in oven under inert environment. The oxygen scavenging test was conducted at different humidity and the performance is shown in FIG. 15. FIG. 15 is a table showing the oxygen concentration (in percent or %) of composite particles annealed in forming gas at 500° C. and at 800° C. with time (in hours or Hrs) according to various embodiments. FIG. 16 is a plot of oxygen concentration (in percent or %) as a function of time (in hours or hrs) showing the oxygen scavenging property of composite particles prepared by annealing in forming gas at different temperatures according to various embodiments.

Oxygen Scavenging Performance of Fe/C Hybrid Particles at Different Humidity

Carbon nanoparticles of 300 nm were mixed with iron (III) nitrate nonahydrate solution (feeding ratio of Fe is 50 wt %) and then dried using the spray dry process. The sample was then annealed in tube furnace for different periods (3 hours to 12 hours) at different temperatures (500° C. to 900° C.) under inert environment. The ramping speed of furnace is set to 5° C./min. After that, the sample was allowed to cool to ambient temperature under argon before removing from the tube furnace. The as-synthesized nanostructured Fe/C particles were mixed with aqueous solution containing NaCl (7.5 wt % of Fe/C) and the samples were dried in oven under inert environment. The oxygen scavenging test was conducted at different humidity relative to 100% and the performance is shown in FIG. 17. FIG. 17 is a table showing the maximum scavenging capacity per gram (g) of iron (Fe) of composite particles at different humidity according to various embodiments.

Figure 18:
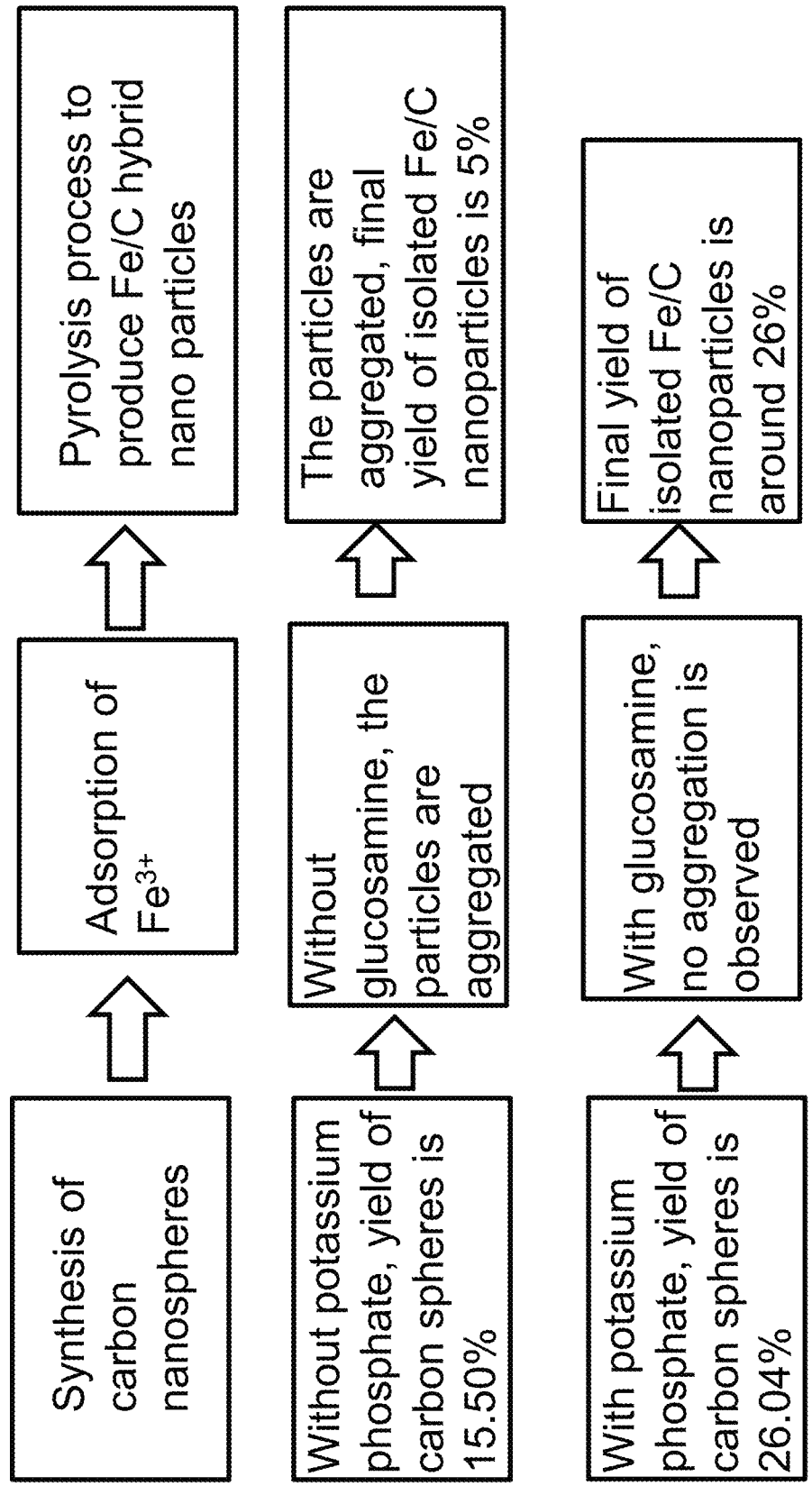
FIG. 18 is a schematic illustrating the impact of addition of potassium phosphate and glucosamine on the composite particles according to various embodiments. The values are based on composite particles of diameters of about 300 nm.

FIG. 18 is a schematic illustrating the impact of addition of potassium phosphate and glucosamine on the composite particles according to various embodiments. The values are based on composite particles of diameters of about 300 nm.

Figure 19A:
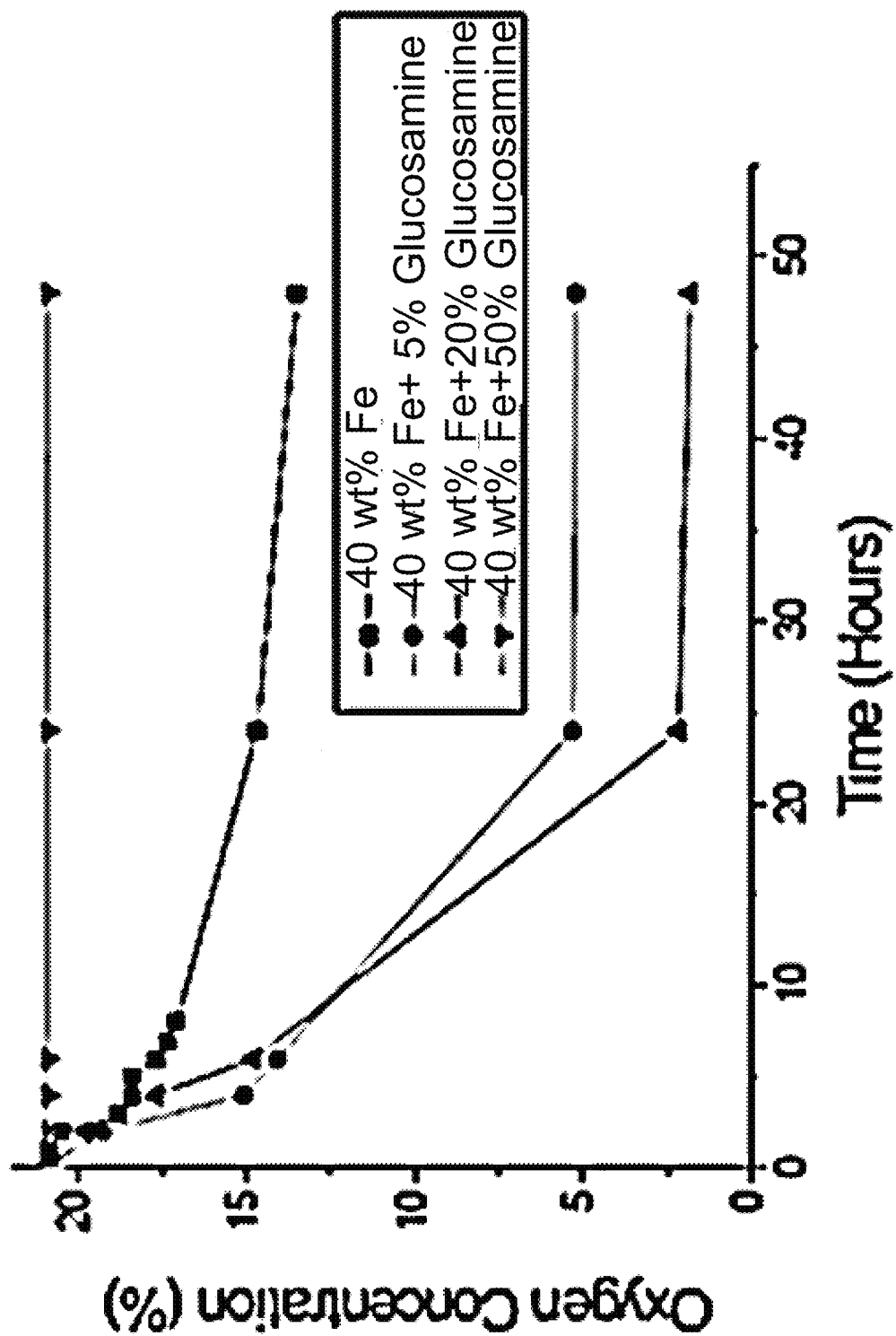
FIG. 19A is a plot of oxygen concentration (in percent or %) as a function of time (in hours) showing the oxygen scavenging performance of composite particles according to various embodiments over time.

FIG. 19A is a plot of oxygen concentration (in percent or %) as a function of time (in hours) showing the oxygen scavenging performance of composite particles according to various embodiments over time. FIG. 19B is a table showing the oxygen ($O_2$) adsorption capacity (in cubic centimeters per gram of iron or cc/g Fe) of composite particles according to various embodiments.

FIGS. 19A-B show that addition of about 20 wt % of glucosamine may lead to higher oxygen scavenging performance.

Figure 20:
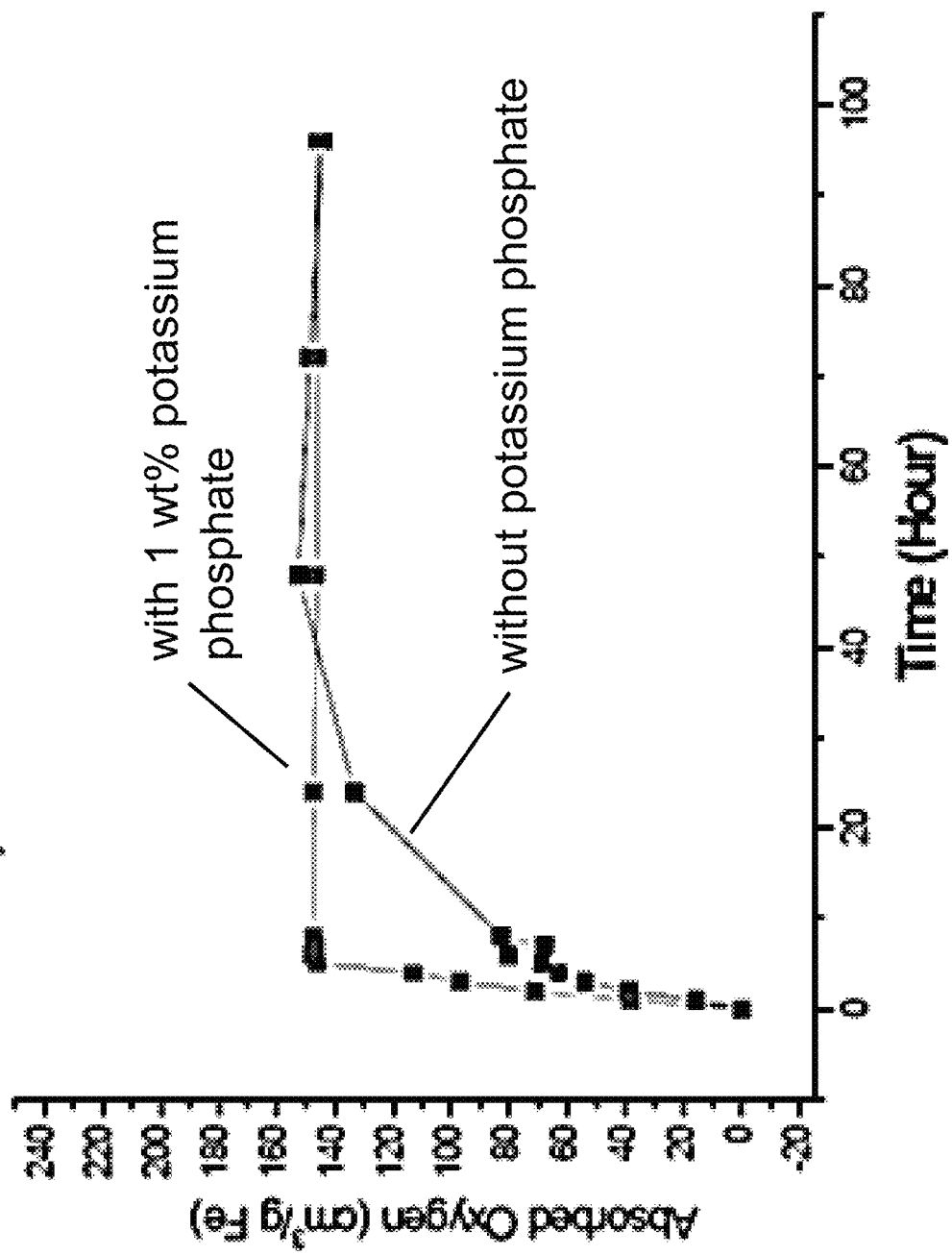
FIG. 20 is a plot of absorbed oxygen (in cubic centimeters per gram of iron or $cm^3$/g Fe) as a function of time (in hours) showing the oxygen scavenging performance of composite particles according to various embodiments over time.

FIG. 20 is a plot of absorbed oxygen (in cubic centimeters per gram of iron or $cm^3$/g Fe) as a function of time (in hours) showing the oxygen scavenging performance of composite particles according to various embodiments over time. FIG. 20 shows that without potassium phosphate ($KH_2PO_4$), it takes about 2 days for the Fe/C particles to reach maximum scavenging performance, while it takes only 8 hours for Fe/C particles to reach scavenging performance.

Various embodiments may provide an iron/carbon hybrid particle with tunable size for highly efficient oxygen scavenging. Various embodiments may provide a method of mass production of hybrid iron/carbon nanoparticles with uniform iron distribution on carbon particles and high yield.

Various embodiments may relate to a process for maximizing the production of nanostructured iron/carbon with tunable size, and in large scale quantities, and may be suitable for industrial production. Various embodiments may involve introduction of potassium phosphate during high temperature treatment, which may produce carbon spheres with smaller sizes at higher yield, and yet may not compromise performance Various embodiments may form hybrid particles in a short time (e.g. less than an hour) and may enhance productivity. Various embodiments may achieve accelerated scavenging speed for quickly eliminating residual oxygen.

Various embodiments may use the spray dry process with addition of glucosamine to form ideal structures with isolated iron nanoparticles on carbon spheres.

Various embodiments may have potential applications in food, beverage, and pharmaceutical packaging, in relation to oxygen scavenging.

Various embodiments may be fixed to a variety of containers such as sachets, permeable bags, sheet-like mats and laminated sheets as a highly efficient oxygen scavenger. Various embodiments may be used in polymer and plastic compounds in bottles. Various embodiments may be used in multi-layer coatings in plastic films. Various embodiments may be used in energy harvesting and storage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:
1. A method of forming one or more composite structures, the method comprising:
 forming one or more carbon structures from a carbon source via a hydrothermal process; and introducing iron onto the one or more carbon structures to form the one or more composite structures comprising carbon and one or more nanostructures comprising iron;

wherein forming the one or more carbon structures from the carbon source further comprises introducing a potassium salt or a phosphate salt; and wherein introducing iron onto the one or more carbon structures to form the one or more composite structures comprises:

dissolving an iron salt in a suitable solvent to form a precursor solution;

mixing the precursor solution and a suspension comprising the one or more carbon structures to form a resultant mixture;

drying the resultant mixture comprising the iron salt and the one or more carbon structures; and adding an anti-agglomeration additive to the resultant mixture before drying the resultant mixture such that each nanostructure of the one or more nanostructures is less than 20 nm.

2. The method according to claim 1, wherein each carbon structure of the one or more carbon structures is a carbon particle.

3. The method according to claim 1, wherein the carbon source is a biomass material.

4. The method according to claim 3, wherein the biomass material is any one selected from a group consisting of D-(+)-glucose, D-(+)-glucosamine hydrochloride, and combination thereof.

5. The method according to claim 1, wherein the anti-agglomeration additive is any one selected from a group consisting of glucosamine, melamine, and a combination thereof.

6. The method according to claim 1, wherein the anti-agglomeration additive is any one value selected from a range from 1% to 50% by weight relative to carbon particles.

7. The method according to claim 1, wherein the potassium salt or the phosphate salt is monopotassium phosphate.

8. The method according to claim 1, wherein introducing the potassium salt or the phosphate salt to the carbon source comprises:

forming a solution comprising the carbon source; and
adding the potassium salt or the phosphate salt to the solution comprising the carbon source.

9. The method according to claim 1, wherein the potassium salt or the phosphate salt is any one value selected from a range from 0.1% to 10% by weight relative to the carbon source.

10. The method according to claim 1, wherein the hydrothermal process is carried out at any temperature range from 180° C. to 210° C.

11. The method according to claim 1, wherein iron comprised in the one or more composite structures is any one value selected from a range from 1% to 80% by weight relative to carbon comprised in the one or more composite structures.

12. The method according to claim 1, wherein introducing iron into the one or more carbon structures to form the one or more composite structures further comprises:

reducing the iron salt by heating the resultant mixture in a pyrolysis process.

13. The method according to claim 12, wherein the resultant mixture is heated in an environment of any one selected from a group consisting of nitrogen, argon, and a mixture of hydrogen and nitrogen.

14. The method according to claim 13, wherein the resultant mixture is heated in an environment of the mixture of hydrogen and nitrogen; and wherein hydrogen is any one value from 1% to 10% by volume relative to nitrogen.

15. The method according to claim 12, wherein a temperature of the pyrolysis process is any one value selected from a range from 500° C. to 900° C.

* * * * *